US012643981B2

(12) United States Patent
Kandanarachchi

(10) Patent No.: US 12,643,981 B2
(45) Date of Patent: Jun. 2, 2026

(54) UNSATURATED CYCLIC ANHYDRIDE END CAPPED POLYIMIDES AND POLYAMIC ACIDS AND PHOTOSENSITIVE COMPOSITIONS THEREOF

(71) Applicant: PROMERUS, LLC, Akron, OH (US)

(72) Inventor: Pramod Kandanarachchi, Akron, OH (US)

(73) Assignee: PROMERUS, LLC, Akron, OH (US)

( * ) Notice: Subject to any disclaimer, the term of this patent is extended or adjusted under 35 U.S.C. 154(b) by 207 days.

(21) Appl. No.: 18/609,823

(22) Filed: Mar. 19, 2024

(65) Prior Publication Data

US 2024/0254284 A1 Aug. 1, 2024

Related U.S. Application Data

(63) Continuation of application No. 16/809,572, filed on Mar. 5, 2020, now abandoned.

(60) Provisional application No. 62/813,948, filed on Mar. 5, 2019.

(51) Int. Cl.
*C08G 73/10* (2006.01)

(52) U.S. Cl.
CPC ..... *C08G 73/1014* (2013.01); *C08G 73/1025* (2013.01); *C08G 73/1032* (2013.01); *C08G 73/105* (2013.01); *C08G 73/1078* (2013.01); *C08G 73/1085* (2013.01)

(58) Field of Classification Search
None
See application file for complete search history.

(56) References Cited

U.S. PATENT DOCUMENTS

| | | | |
|---|---|---|---|
| 4,778,859 | A | 10/1988 | Ai et al. |
| 2002/0093077 | A1 | 7/2002 | Jung et al. |
| 2009/0176172 | A1 | 7/2009 | Yamanaka et al. |
| 2015/0219990 | A1 | 8/2015 | Malik et al. |
| 2017/0298186 | A1 | 10/2017 | Takemura et al. |
| 2018/0215874 | A1 | 8/2018 | Kawabata et al. |

FOREIGN PATENT DOCUMENTS

| | | | |
|---|---|---|---|
| JP | 5040340 | A | 2/1993 |
| WO | WO 2017110982 | A1 | 6/2017 |

*Primary Examiner* — Rachel Kahn
(74) *Attorney, Agent, or Firm* — Balaram Gupta

(57) ABSTRACT

Embodiments in accordance with the present invention encompass polyamic acid or polyimide polymers containing a reactive unsaturated cyclic anhydride end group as well as photosensitive compositions made therefrom which are useful for forming films that can be patterned to create structures for microelectronic devices, microelectronic packaging, microelectromechanical systems, optoelectronic devices and displays. In some embodiments the compositions of this invention are shown to feature excellent hitherto unachievable mechanical properties. The negative images formed therefrom exhibit improved thermo-mechanical properties, among other property enhancements.

18 Claims, 2 Drawing Sheets

UNSATURATED CYCLIC ANHYDRIDE END CAPPED POLYIMIDES AND POLYAMIC ACIDS AND PHOTOSENSITIVE COMPOSITIONS THEREOF

CROSS REFERENCE TO RELATED APPLICATIONS

This application is a continuation of U.S. application Ser. No. 16/809,572, filed Mar. 5, 2020, now pending, which claims the benefit of U.S. Provisional Application No. 62/813,948, filed Mar. 5, 2019, which is incorporated herein by reference in its entirety.

BACKGROUND OF THE INVENTION

Field of the Invention

The present invention relates to a series of unsaturated cyclic anhydride end capped polyamic acid and polyimide polymers. More specifically, the present invention relates to a photosensitive composition containing unsaturated cyclic anhydride, such as itaconic anhydride end capped polyamic acid and polyimide polymers. The compositions of this invention are useful for forming microelectronic and/or optoelectronic devices and assemblies thereof, and more specifically, such compositions exhibit improved thermal, mechanical and opto-electronic properties.

Description of the Art

Organic polymer materials are increasingly being used in the microelectronics and optoelectronics industries for a variety of applications. For example, the uses for such organic polymer materials include permanent interlevel dielectrics, redistribution layers (RDL), stress buffer layers, chip stacking and/or bonding, leveling or planarization layers, alpha-particle barriers, passivation layers, among others, in the fabrication of a variety of microelectronic and optoelectronic devices. Where such organic polymer materials are photosensitive, thus self-imageable, and therefore, offer additional advantage of reducing the number of processing steps required for the use of such layers and structures made therefrom. Additionally, such organic polymer materials enable the direct adhesive bonding of devices and device components to form various structures. Such devices include microelectromechanical systems (MEMS), microoptoelectromechanical systems (MOEMS) and the semiconductor device encompassing a complementary metal oxide semiconductor (CMOS) image sensor dam structure, and the like.

There has been innumerable polymeric materials used in the art in order to achieve the above noted desired requirements. One such class of polymers include polyimides and its precursor, polyamic acid. However, most of the polyimides disclosed in the art are generally for positive tone image forming films, and many not suitable for many applications. Some of the drawbacks include use of highly toxic and corrosive phenolic monomers which provide alkali solubility that is required for forming positive tone compositions. Other property disadvantages include insolubility of the polyimides and/or the precursor polyamic acids in commonly used solvents in the electronic industry, poor photo imaging capabilities, among others. Even more importantly, such compositions suffer from poor thermo-mechanical properties and may require high cure temperatures, often times higher than 300° C., which are undesirable. See for example, U.S. Pat. Nos. 8,946,852 B2 and 7,485,405 B2.

Accordingly, it is an object of this invention to provide a series of unsaturated cyclic anhydride end capped polyamic acid and polyimide polymers and their compositions that provide improved thermo-mechanical properties.

It is also an object of this invention to provide compositions which can be cured at lower temperatures than the conventional polyimides that exhibit improved thermo-mechanical properties.

Other objects and further scope of the applicability of the present invention will become apparent from the detailed description that follows.

SUMMARY OF THE INVENTION

Surprisingly, it has now been found that incorporating unsaturated cyclic anhydride, such as itaconic anhydride, as an end capped group for forming a series of polyamic acid and polyimide polymers as described herein provides hitherto unattainable thermo-mechanical properties, among other property advantages. More specifically, the polyamic acid and polyimide polymers as disclosed herein can be made by employing any of the known dianhydrides and diamines in combination with a substituted unsaturated cyclic anhydride to produce unsaturated cyclic anhydride capped polyamic acid or polyimide, which are soluble in commonly used organic solvents. The polymers of this invention can then be combined with a number of additives to form photosensitive compositions which feature excellent thermo-mechanical properties, photo-imaging properties, low cure temperatures, generally below 250° C. or lower, among other property enhancements.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION OF THE INVENTION

Figure 1:
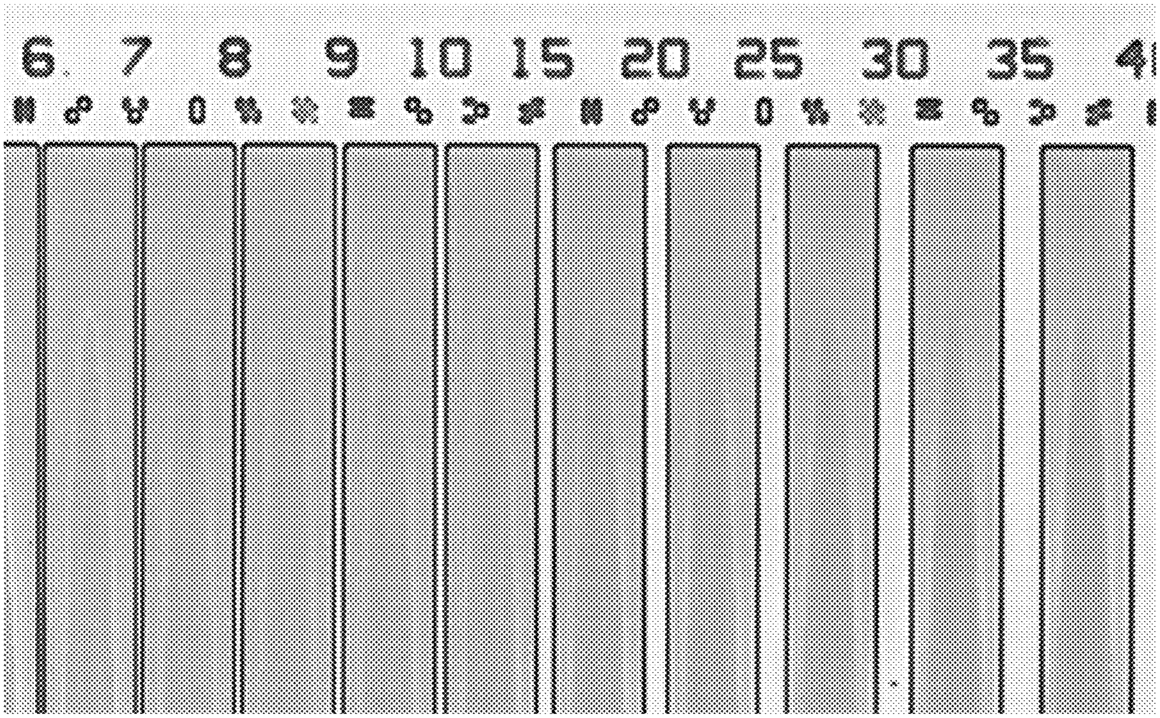
FIGS. 1 to 3 show top down optical micrograph images of a composition embodiment of this invention

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "$(C_1-C_4)$acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

As used herein, the expression "heterocycle" includes all of the known reduced heteroatom containing cyclic radicals. Representative 5-membered heterocycle radicals include tetrahydrofuranyl, tetrahydrothiophenyl, pyrrolidinyl, 2-thiazolinyl, tetrahydrothiazolyl, tetrahydrooxazolyl, and the like. Representative 6-membered heterocycle radicals include piperidinyl, piperazinyl, morpholinyl, thiomorpholinyl, and the like. Various other heterocycle radicals include, without limitation, aziridinyl, azepanyl, diazepanyl, diazabicyclo[2.2.1]hept-2-yl, and triazocanyl, and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1-C_6)$alkyl, $(C_2-C_6)$alkenyl, $(C_1-C_6)$perfluoroalkyl, phenyl, hydroxy, $—CO_2H$, an ester, an amide, $(C_1-C_6)$alkoxy, $(C_1-C_6)$thioalkyl and $(C_1-C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

It will be understood that the terms "dielectric" and "insulating" are used interchangeably herein. Thus reference to an insulating material or layer is inclusive of a dielectric material or layer and vice versa.

It will be understood that, as used herein, the phrase "microelectronic device" is inclusive of a "micro-optoelectronic device" and an "optoelectronic device". Thus, reference to microelectronic devices or a microelectronic device assemblies are inclusive of optoelectronic devices and micro-optoelectronic devices as well as assemblies thereof.

It will be understood that the term "redistribution layer (RDL)" refers to an electrical signal routing insulation material which features desirable and reliable properties. The term RDL may also be used interchangeably to describe buffer coating layers, such as for example, a stress relief or buffer layer between the solder ball and fragile low-K structure.

As used herein, the terms "polymer composition," "copolymer composition," "terpolymer composition" or "tetrapolymer composition" are used herein interchangeably and are meant to include at least one synthesized polymer, copolymer, terpolymer or tetrapolymer, as well as residues from initiators, solvents or other elements attendant to the synthesis of such polymers, where such residues are understood as not necessarily being covalently incorporated thereto. But some catalysts or initiators may sometimes be covalently bound to a part of the polymeric chain either at the beginning and/or end of the polymeric chain. Such residues and other elements considered as part of the "polymer" or "polymer composition" are typically mixed or co-mingled with the polymer such that they tend to remain therewith when it is transferred between vessels or between solvent or dispersion media. A polymer composition can also include materials added after synthesis of the polymer to provide or modify specific properties of such composition. Such materials include, but are not limited to solvent(s), antioxidant(s), photoinitiator(s), sensitizers and other materials as will be discussed more fully below.

As used herein, the term "modulus" is understood to mean the ratio of stress to strain and unless otherwise indicated, refers to the Young's Modulus or Tensile Modulus measured in the linear elastic region of the stress-strain curve. Modulus values are generally measured in accordance with ASTM method DI708-95. Films having a low modulus are understood to also have low internal stress.

The term "photodefinable" refers to the characteristic of a material or composition of materials, such as a polymer or polymer composition in accordance with embodiments of the present invention, to be formed into, in and of itself, a patterned layer or a structure. In alternate language, a "photodefinable layer" does not require the use of another material layer formed thereover, for example, a photoresist layer, to form the aforementioned patterned layer or structure. It will be further understood that a polymer composition having such a characteristic is generally employed in a pattern forming scheme to form a patterned film/layer or structure. It will be noted that such a scheme incorporates an "imagewise exposure" of the photodefinable material or layer formed therefrom. Such imagewise exposure being taken to mean an exposure to actinic radiation of selected portions of the layer, where non-selected portions are protected from such exposure to actinic radiation.

As used herein, the term "self-imageable compositions" will be understood to mean a material that is photodefinable and can thus provide patterned layers and/or structures after direct image-wise exposure of a film formed thereof followed by development of such images in the film using an appropriate developer.

By the term "derived" is meant that the polymeric repeating units are formed from, for example, condensation of a dianhydride with a diamine. That is, polyimide repeat units are derived from the corresponding dianhydride and diamine. Generally, such condensation reaction first results in a polyamic acid which is further condensed to form a polyimide as described further in detail below. Accordingly, a polyamic acid or a polyimide is generally derived from the condensation of equimolar amounts of at least one dianhydride with one diamine. When a mono-anhydride or a mono-amine is used off-setting the stoichiometry, the resulting polyimide will be end-capped with such excess amount of either the mono-anhydride or the mono-amine employed.

Thus, in accordance with the practice of this invention there is provided an end capped polyamic acid of the formula (IA) or an end capped polyimide of the formula (IB):

(IA)

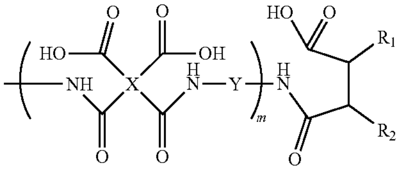

-continued (IB)

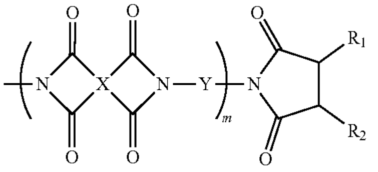

wherein:

m is an integer of at least 50;

X is one or more distinct tetravalent organic group;

Y is one or more distinct divalent organic group; and $R_1$ and $R_2$ are the same or different and each independently of one another selected from the group consisting of linear or branched $(C_1-C_{16})$alkenyl, hydroxy$(C_1-C_{12})$alkenyl, perfluoro$(C_1-C_{12})$alkenyl, and $(C_6-C_{10})$aryl$(C_1-C_3)$alkenyl.

The polyamic acid of formula (IA) or polyimide of formula (IB) of this invention can be synthesized by any of the procedures known to one skilled in the art. As noted above, such methods include condensation of one or more dianhydrides with one or more diamines essentially in equimolar ratios. Further, suitable amounts of substituted unsaturated cyclic anhydride of formula (II) is employed to end cap the resulting polyamic acid or polyimide. Any of the dianhydrides or diamines in combination with substituted cyclic anhydride or their equivalent precursor compounds can be employed.

More specifically, the dianhydrides and the diamines that are suitable for forming the polyamic acid or polyimide of this invention can be represented by the following general formulae (IC) and (ID).

(IC)

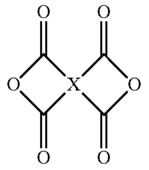

(ID)

$H_2N—Y—NH_2$

Wherein X and Y are as defined herein. Thus, any of the dianhydrides of tetracarboxylic acids in combination with any of the diamines can be employed to form the polyamic acid and subsequently the polyimides. Again, as noted, any of the techniques known in the art to make polyimides and/or polyamic acid can be employed herein in combination with desirable amounts of the cyclic anhydride of formula (II).

Now turning specifically to X, any of the suitable tetravalent organic group can be employed herein. Non-limiting examples of such X may be selected from the group consisting of:

X-1

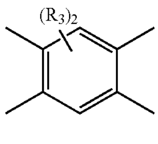

;

-continued

X-2

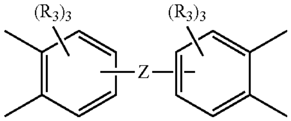

X-3

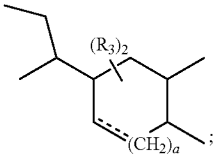

X-4

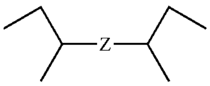

wherein a is an integer from 0 to 4, inclusive;

is a single bond or a double bond;

each of $R_3$ is independently selected from the group consisting of hydrogen, methyl, ethyl, linear or branched ($C_3$-$C_6$)alkyl, trifluoromethyl, pentafluoroethyl, linear or branched perfluoro($C_3$-$C_6$)alkyl, methoxy, ethoxy, linear or branched ($C_3$-$C_6$)alkyloxy, ($C_2$-$C_6$)acyl, ($C_2$-$C_6$)acyloxy, phenyl and phenoxy;

Z is a divalent group selected from the group consisting of:

$(CR_4R_5)_b$, $O(CR_4R_5)_b$, $(CR_4R_5)_bO$, $(OCR_4R_5)_d$, $(CR_4R_5O)_d$, $(CR_4R_5)_b$—O—$(CR_4R_5)_c$, $(CR_4R_5)_b$—O—$(SiR_4R_5)_c$, $(CR_4R_5)_b$—(CO)O—$(CR_4R_5)_c$, $(CR_4R_5)_b$—O(CO)—$(CR_4R_5)_c$, $(CR_4R_5)_b$—(CO)—$(CR_4R_5)_c$, $(CR_4R_5)_b$—(CO)NH—$(CR_4R_5)_c$, $(CR_4R_5)_b$—NH(CO)—$(CR_4R_5)_c$, $(CR_4R_5)_b$—NH—$(CR_4R_5)_c$, where b and c are integers which may be the same or different and each independently is 0 to 12, and d is an integer from 1 to 12, inclusive;

$R_4$ and $R_5$ are the same or different and each independently selected from the group consisting of hydrogen, methyl, ethyl, linear or branched ($C_3$-$C_6$)alkyl, trifluoromethyl, pentafluoroethyl, linear or branched perfluoro($C_3$-$C_6$)alkyl, methoxy, ethoxy, linear or branched ($C_3$-$C_6$)alkyloxy, ($C_2$-$C_6$)acyl, ($C_2$-$C_6$)acyloxy, phenyl and phenoxy.

Even more specifically, suitable dianhydrides may include the following:

(X-1a)

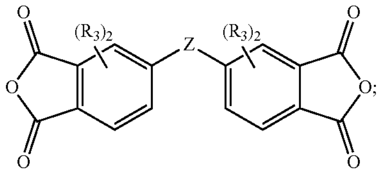

(X-1b)

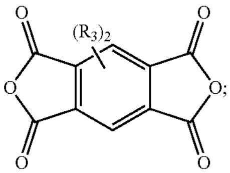

-continued (X-1c)

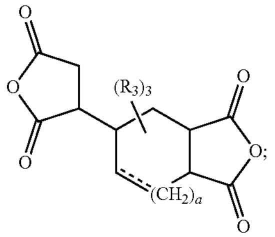

(X-1d)

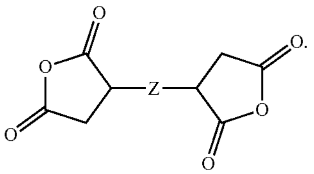

Even more specifically, one or more of the dianhydrides of the following formulae can also be employed herein.

(X-1e)

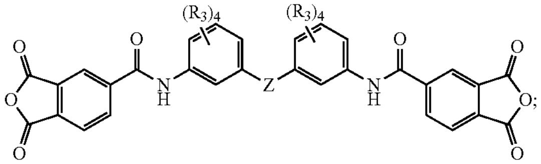

and (X-1f)

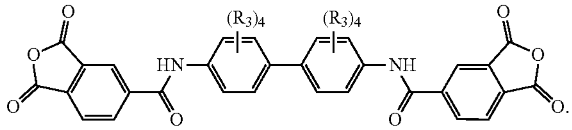

Where a, Z and $R_3$ are as defined herein.

In some embodiments, the polyimide or polyamic acid of this invention are formed using the dianhydrides where X is derived from one or more dianhydrides selected from the group consisting of:

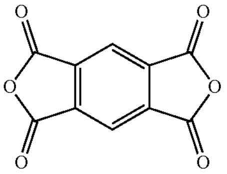 [SMILES: O=c1oc(=O)c2cc3c(=O)oc(=O)c3cc12]

1H,3H-benzo[1,2-c:4,5-c']difuran-1,3,5,7-tetraone (PMDA)

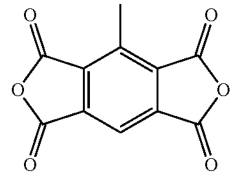 [SMILES: Cc1c2c(=O)oc(=O)c2cc2c(=O)oc(=O)c12]

4-methyl-1H,3H-benzo[1,2-c:4,5-c']difuran-1,3,5,7-tetraone

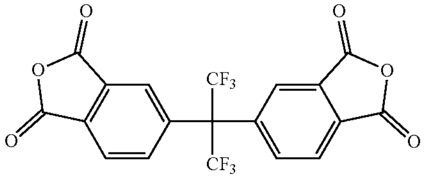

5,5'-(perfluoropropane-2,2-diyl)bis(isobenzofuran-1,3-dione) (6FDA)

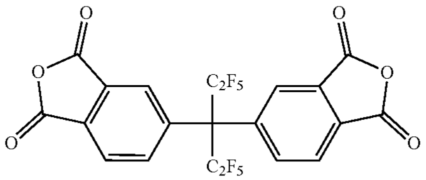

5,5'-(perfluoropentane-3,3-diyl)bis(isobenzofuran-1,3-dione)

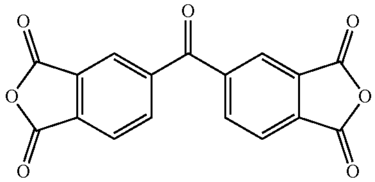 [SMILES: O=C(c1ccc2c(c1)C(=O)OC2=O)c1ccc2c(c1)C(=O)OC2=O]

5,5'-carbonylbis(isobenzofuran-1,3-dione) (BTDA)

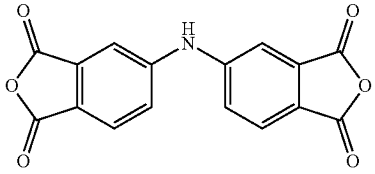 [SMILES: O=C1OC(=O)c2cc(Nc3ccc4c(c3)C(=O)OC4=O)ccc21]

5,5'-azanediylbis(isobenzofuran-1,3-dione)

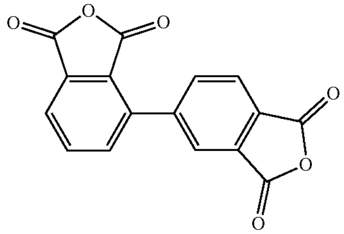 [SMILES: O=C1OC(=O)c2cc(-c3cccc4c3C(=O)OC4=O)ccc21]

[4,5'-biisobenzofuran]-1,1',3,3'-tetraone (α-BPDA)

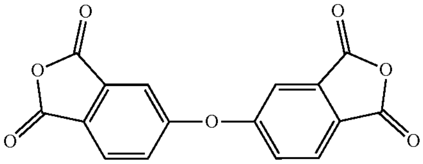 [SMILES: O=C1OC(=O)c2cc(Oc3ccc4c(c3)C(=O)OC4=O)ccc21]

5,5'-oxybis(isobenzofuran-1,3-dione) (ODPA)

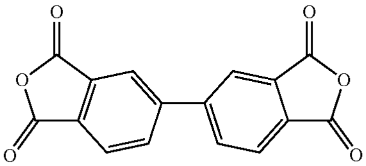 [SMILES: O=C1OC(=O)c2cc(-c3ccc4c(c3)C(=O)OC4=O)ccc21]

[5,5'-biisobenzofuran]-1,1',3,3'-tetraone (BPDA); and

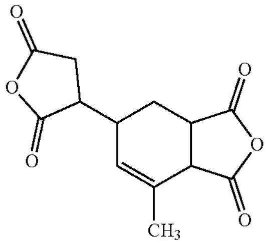 [SMILES: CC1=CC(C2CC(=O)OC2=O)CC2C(=O)OC(=O)C12]

5-(2,5-dioxotetrahydrofuran-3-yl)-7-methyl-3a,4,5,7a-tetrahydroisobenzofuran-1,3-dione (D1901)

As noted, again, any of the diamines known in the art can be used to form the polyamide or polyamic acid of this invention. The diamines can again be broadly classified as aromatic diamines, aliphatic diamines or mixed aliphatic-aromatic diamines which contain a wide variety of bridging groups. A non-limiting generic types of diamines include the following:

(Y-1a)

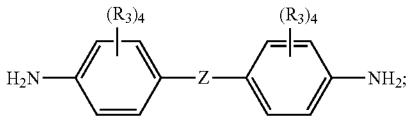

(Y-1b)

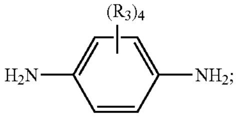

Where a, Z and $R_3$ are as defined herein.

In some embodiments, the polyimide or polyamic acid of this invention are formed using the diamines where Y is derived from one or more diamines selected from the group consisting of:

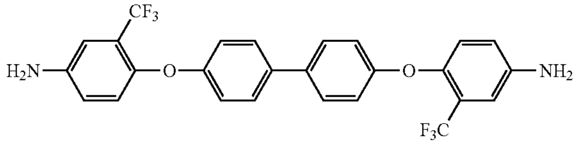 [SMILES: Nc1ccc(Oc2ccc(-c3ccc(Oc4ccc(N)cc4C(F)(F)F)cc3)cc2)c(C(F)(F)F)c1]

4,4'-([1,1'-biphenyl]-4,4'-diylbis(oxy))bis(3-(trifluoromethyl)aniline) (6BF)

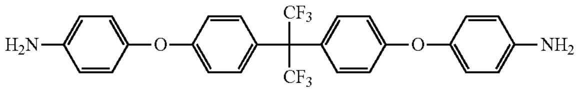

4,4'-(((perfluoropropane-2,2-diyl)bis(4,1-phenylene))bis(oxy))dianiline (HFBAPP)

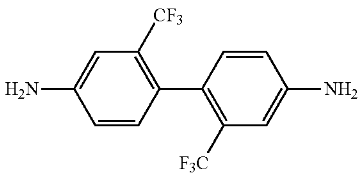 [SMILES: Nc1ccc(-c2ccc(N)cc2C(F)(F)F)c(C(F)(F)F)c1]

2,2'-bis(trifluoromethyl)-[1,1'-biphenyl]-4,4'-diamine (PFMB)

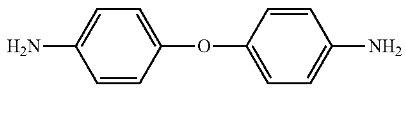 [SMILES: Nc1ccc(Oc2ccc(N)cc2)cc1]

4,4'-oxydianiline (4,4'-ODA)

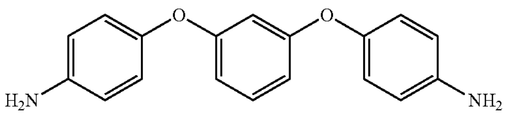 [SMILES: Nc1ccc(Oc2cccc(Oc3ccc(N)cc3)c2)cc1]

4,4'-(1,3-phenylenebis(oxy))dianiline (APB)

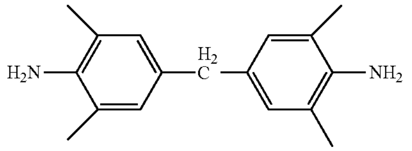 [SMILES: Cc1cc(Cc2cc(C)c(N)c(C)c2)cc(C)c1N]

4,4'-methylenebis(2,6-dimethylaniline) (DO3)

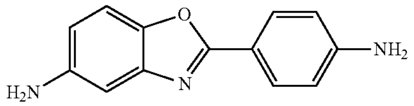

2-(4-aminophenyl)benzo[d]oxazol-5-amine (BZXPh-5)

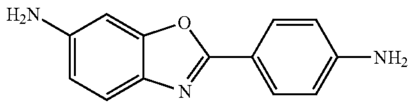 [SMILES: Nc1ccc(-c2nc3ccc(N)cc3o2)cc1]

2-(4-aminophenyl)benzo[d]oxazol-6-amine (BZXPh-6)

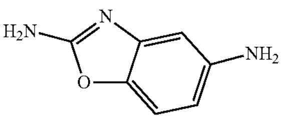 [SMILES: Nc1ccc2oc(N)nc2c1]

benzo[d]oxazole-2,5-diamine (BZX-5)

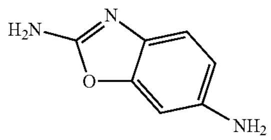 [SMILES: Nc1ccc2nc(N)oc2c1]

benzo[d]oxazole-2,6-diamine (BZX-6)

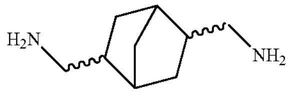 [SMILES: NCC1CC2CC1CC2CN]

bicyclo[2.2.1]heptane-2,5-diyldimethanamine (NBDA)

a diamine of formula (IIIA)

(IIIB)

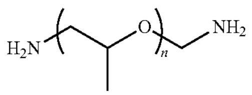

where, n=2 to 6 (JD-230);

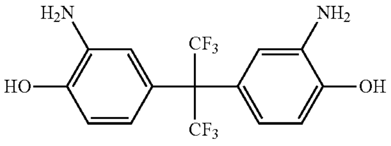

4,4'-(perfluoropropane-2,2-diyl)bis(2-aminophenol) (BAFA); and

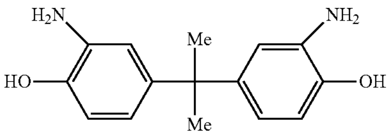 [SMILES: CC(C)(c1ccc(O)c(N)c1)c1ccc(O)c(N)c1]

4,4'-(propane-2,2-diyl)bis(2-aminophenol) (DABPA)

As noted, the polyamic acid or polyimide of this invention are end capped with a suitable unsaturated cyclic anhydride. A suitable end capped unsaturated cyclic anhydride group is derived from a compound of formula (II):

(II)

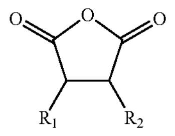

wherein $R_1$ and $R_2$ are as defined in claim 1.

Various compounds of formula (II) are well known in the art and are commercially available or can be made readily following the procedures reported in the art. For example, a compound of formula (II) where $R_2$ is hydrogen and $R_1$ is methylene ($=CH_2$), commonly known as itaconic anhydride, is commercially available from Sigma Aldrich. Similarly, a compound of formula (II) where $R_2$ is hydrogen and $R_1$ is isobutylene ($-CH_2C(=CH_2)CH_3$), 3-(2-methylallyl) dihydrofuran-2,5-dione (MPSA), is commercially available from Combi Blocks.

Again, any of the unsaturated cyclic anhydride of formula (II) that will bring about the intended benefit can be employed herein. Non-limiting examples of the compound of formula (II) is selected from the group consisting of:

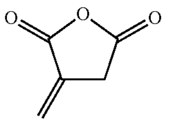

itaconic anhydride (IA)

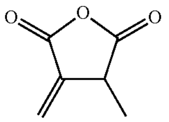

3-methyl-4-methylenedihydrofuran-2,5-dione

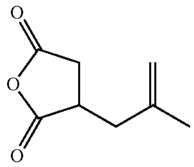

3-(2-methylallyl)dihydrofuran-2,5-dione (MPSA); and

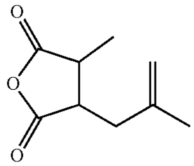

3-methyl-4-(2-methylallyl)dihydrofuran-2,5-dione

The polyamic acid or the polyimide of this invention having suitable molecular weight can be tailored based on the intended application by employing appropriate polycondensation methods. Accordingly, in some embodiments the number of repeat units, m, in the resulting polyamic acid or the polyimide is at least 50; in some other embodiments m is at least 100, 500, 1000, 2000 or higher. In some embodiments m is from 50 to 2000, inclusive. The degree of polycondensation can be measured by determining the molecular weight of the resulting polyamic acid or the polyimide using any of the known methods in the art, such as for example, by gel permeation chromatography (GPC) equipped with suitable detector and calibration standards, such as differential refractive index detector calibrated with narrow-distribution polystyrene standards.

Accordingly, the polyamic acid or the polyimide of this invention generally exhibit a weight average molecular weight ($M_w$) of at least about 5,000. In some other embodiments, the polyamic acid or polyimide as described herein exhibit a weight average molecular weight ($M_w$) of at least about 20,000. In some other embodiments, the polyamic acid or polyimide made in accordance of this invention has a $M_w$ of at least about 50,000.

In yet another embodiment, the polyamic acid or polyimide of this invention has a $M_w$ of at least about 100,000. In some other embodiments, the polyamic acid or polyimide of this invention has a $M_w$ of at least about 200,000. In some other embodiments, the polyamic acid or polyimide of this invention has a $M_w$ ranging from about 50,000 to 500,000, or higher. The polyamic acid or polyimide of this invention generally contains an amic acid or imide repeat unit derived from at least one dianhydride and at least one diamine end capped with a cyclic anhydride of formula (II) as described herein. In some other embodiments, the polyamic acid or the polyimide of this invention contains an amic acid or imide repeat units derived from two or more anhydrides and two or more diamines as described herein, which is further end capped with the cyclic anhydride of formula (II) as described herein. All of such permutation and combinations are part of this invention.

Generally, equimolar ratios of dianhydrides and diamines are employed to form the polyamic acid or the polyimide. That is, one mole of dianhydride is condensed with one mole of diamine. When two or more dianhydrides or diamines are employed, any of the molar ratios of the respective two or more dianhydrides and diamines can be employed so as to tailor the properties of the resulting polyamic acid or the polyimide and depending upon the intended applications.

In any event, the polyamic acid or the polyimide of this invention contains generally equal molar amounts of the total dianhydride and the total diamines when more than one dianhydride or more than one diamine is employed. That is, a polyamic or the polyimide of this invention is made by employing equimolar amounts of dianhydride and diamine, which includes the molar amounts of the end capped cyclic anhydride of formula (II).

Non-limiting examples of a polyamic acid or a polyimide made in accordance of this invention may be enumerated as follows:

A polyamic acid formed from 5,5'-(perfluoropropane-2,2-diyl)bis(isobenzofuran-1,3-dione) (6FDA), 4,4'-([1,1'-biphenyl]-4,4'-diylbis(oxy))bis(3-(trifluoromethyl)aniline) (6BF), 2-(4-aminophenyl)benzo[d]oxazol-5-amine (BZXPh-5) and itaconic anhydride (IA).

A polyimide formed from 5,5'-(perfluoropropane-2,2-diyl)bis(isobenzofuran-1,3-dione) (6FDA), 4,4'-([1,1'-biphenyl]-4,4'-diylbis(oxy))bis(3-(trifluoromethyl)aniline) (6BF), 2-(4-aminophenyl)benzo[d]oxazol-5-amine (BZXPh-5) and itaconic anhydride (IA).

A polyamic acid formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl)aniline) (6BF), 2,2'-bis(trifluoromethyl)-[1,1'-biphenyl]-4,4'-diamine (PFMB) and itaconic anhydride (IA).

A polyimide formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl)aniline) (6BF), 2,2'-bis(trifluoromethyl)-[1,1'-biphenyl]-4,4'-diamine (PFMB) and itaconic anhydride (IA).

A polyamic acid formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-(((perfluoropropane-2,2-diyl)bis(4,1-phenylene))bis(oxy))dianiline (HFBAPP), 2,2'-bis(trifluoromethyl)-[1,1'-biphenyl]-4,4'-diamine (PFMB) and itaconic anhydride (IA).

A polyimide formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-(((perfluoropropane-2,2-diyl)bis(4,1-phenylene))bis(oxy))dianiline (HFBAPP), 2,2'-bis(trifluoromethyl)-[1,1'-biphenyl]-4,4'-diamine (PFMB) and itaconic anhydride (IA).

A polyamic acid formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl)aniline) (6BF), 2-(4-aminophenyl)benzo[d]oxazol-5-amine (BZXPh-5) and itaconic anhydride (IA).

A polyimide formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl)aniline) (6BF), 2-(4-aminophenyl)benzo[d]oxazol-5-amine (BZXPh-5) and itaconic anhydride (IA).

Advantageously, several of the polyamic acid or the polyimide of this invention are soluble in an organic solvent. Exemplary organic solvents, without any limitation, that can be employed to dissolve the polyamic acid or the polyimide of this invention are selected from the group consisting of N-methyl-2-pyrrolidone (NMP), γ-butyrolactone (GBL), N,N-dimethylacetamide (DMAc), propylene glycol monomethyl ether acetate (PGMEA), dimethyl sulfoxide (DMSO), cyclopentanone, cyclohexanone, 2-butanone and 2-heptanone and mixtures in any combination thereof. As noted, any of the aforementioned solvents can be used alone or in combination with one or more solvents.

Advantageously the polyimides of this invention exhibit very high thermo-mechanical properties. Specifically, it has now been found that the films formed from the polyimides of this invention exhibit excellent tensile properties as well as very high elongation to break (ETB). The films can be readily formed from any of the known solvent casting methods as well as melt extrusion methods. For example, the polyamic acid or polyimide of this invention can be coated onto a suitable substrate, such as for example, spin coating. The coated substrates are then baked to remove any residual solvents especially in the case of polyimide coated substrate. The polyamic acid coated substrates are further baked to form the polyimide at a suitable temperature. Such post apply baking (PAB) temperatures can range from about 100° C. to 150° C. for a sufficient length of time from about 2 minutes to 30 minutes. In some embodiments such PAB temperature is at about 110° C. for about 3 minutes. The polyamic acid films so formed are then cured at a temperature in the range of from about 280° C. to 350° C. to form the polyimide films for a sufficient length of time ranging from about 2 hours to 4 hours under inert atmosphere, such as for example, nitrogen atmosphere. In some embodiments such curing is carried out at 320° C. for about 3 hours.

In some embodiments the films of polyimide polymers of this invention can be formed directly from the solutions of the respective polyimide polymers by casting on to a suitable substrate. The polyimide polymer coated substrates are post apply baked (PAB) at temperatures ranging from about 100° C. to 150° C. for a sufficient length of time, typically, from about 2 minutes to 30 minutes. In some embodiments such PAB temperature is at about 110° C. for about 3 minutes. The polyimide films so formed are then cured at a significantly lower temperature than mentioned above, such as for example in the temperature range of from about 150° C. to 250° C. to form the fully cured polyimide films for a sufficient length of time ranging from about 2 hours to 6 hours under inert atmosphere, such as for example, nitrogen atmosphere. In some embodiments such curing is carried out at 170° C. for about 4 hours. In some other embodiments such curing is carried out at 220° C. for about 3 to 4 hours.

The cured polyimide films can readily be lifted out of the substrates for mechanical property testing. The tensile strength of the so formed films are generally in the range from about 100 MPa to about 250 MPa depending upon the type of dianhydrides and diamines employed to form the polyimide. In some embodiments the tensile strength is from about 150 MPa to about 200 MPa and in some other embodiments the tensile strength is from about 160 MPa to about 180 MPa. The ETB of the films are generally high as well. The ETB can range from about 30 percent to 100 percent or higher. In some embodiments the ETB ranges from about 40 percent to 90 percent, 50 percent to 80 percent, and so on.

In a further aspect of this invention there is further provided a composition comprising the polyamic acid or the polyimide of formulae (IA) or (IB) as described herein in combination with a photo radical generator and a thermal radical generator. The compositions of this invention are photosensitive, and therefore, can be employed in a variety of optoelectronic application for forming a variety of polymeric layers, which may be patternable so as to find applications as dielectric materials.

The composition of this invention encompasses all of the polyamic acids and polyimides as described hereinabove derived from any of the dianhydrides, diamines, and end capped with an unsaturated cyclic anhydride as described hereinabove and hereafter, including the specific polyamic acids and the polyimides enumerated above and specifically exemplified below.

Any of the photo radical generators that would provide the intended benefit can be employed. That is, the radicals generated by the photo radical generator will cause the photo radical crosslinking of the polyamic acid and/or the polyimides of this invention with various ingredients used in the compositions of this invention so as to form polymeric layers. In some embodiments, the composition of this invention encompasses a photo radical generator selected from the group consisting of:

a compound of formula (IV):

(IV)

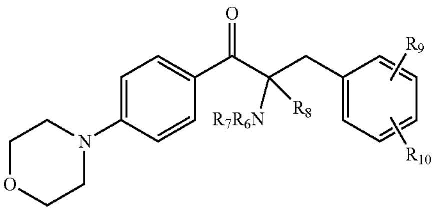

wherein $R_6$ and $R_7$ are the same or different and each independently of one another selected from the group consisting of hydrogen, linear or branched $(C_1\text{-}C_8)$alkyl and $(C_6\text{-}C_{10})$aryl, or $R_6$ and $R_7$ taken together with the nitrogen atom to which they are attached to form a 5 to 7 membered monocyclic ring or 6 to 12 membered bicyclic ring, said ring optionally containing one or more heteroatoms selected from O and N, and said ring optionally substituted with a group selected from the group consisting of linear or branched $(C_1\text{-}C_8)$alkyl, $(C_6\text{-}C_{10})$aryl, halogen, hydroxy, linear or branched $(C_1\text{-}C_8)$alkoxy and $(C_6\text{-}C_{10})$aryloxy; and $R_8$, $R_9$ and $R_{10}$ are the same or different and each independently of one another is selected from the group consisting of hydrogen, linear or branched $(C_1\text{-}C_{16})$ alkyl, $(C_6\text{-}C_{10})$aryl, $(C_6\text{-}C_{10})$aryl$(C_1\text{-}C_3)$alkyl, hydroxy, halogen, linear or branched $(C_1\text{-}C_{12})$alkoxy and $(C_6\text{-}C_{10})$aryloxy; and a compound of formula (V):

(V)

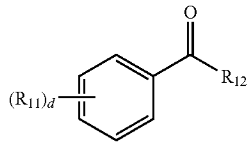

wherein d is an integer from 0 to 3, inclusive;

$R_{11}$ is selected from the group consisting of hydrogen, linear or branched $(C_1\text{-}C_{16})$alkyl, $(C_6\text{-}C_{10})$aryl, $(C_6\text{-}C_{10})$aryl$(C_1\text{-}C_3)$alkyl, hydroxy, halogen, linear or branched $(C_1\text{-}C_{12})$alkoxy and $(C_6\text{-}C_{10})$aryloxy;

$R_{12}$ is selected from the group consisting of linear or branched $(C_1\text{-}C_{16})$alkyl, $(C_3\text{-}C_8)$cycloalkyl, $(C_6\text{-}C_{10})$ aryl, $(C_6\text{-}C_{10})$aryl$(C_1\text{-}C_3)$alkyl, $(C_6\text{-}C_{10})$aryl$(C_1\text{-}C_6)$alkylphosphinate, $(C_6\text{-}C_{10})$heterocycle$(C_1\text{-}C_3)$alkyl, a group of formula $C(O)—(OCH_2CH_2)_e—OC(O)C(O)$ $(C_6\text{-}C_{10})$aryl, where e is an integer from 2 to 4, inclusive, $C(O)C(O)O(C_1\text{-}C_3)$alkyl and a group of formula (C):

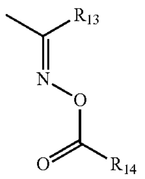

wherein $R_{13}$ is linear or branched $(C_1\text{-}C_{16})$alkyl; and $R_{14}$ is $(C_6\text{-}C_{10})$aryl;

and where each of said alkyl, cycloalkyl, aryl and heterocycle may additionally be substituted with one or more groups selected from the group consisting of hydroxy, linear or branched $(C_1\text{-}C_6)$alkyl, linear or branched $(C_1\text{-}C_6)$alkoxy and linear or branched thio $(C_1\text{-}C_6)$alkyl.

Non-limiting examples of the photo radical generator are enumerated as follows:

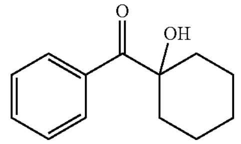 [SMILES: O=C(c1ccccc1)C1(O)CCCCC1]

(1-hydroxycyclohexyl)(phenyl)methanone (commercially available as IRGACURE 184 from Ciba Specialty Chemicals)

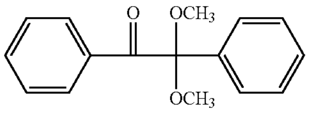

2,2-dimethoxy-1,2-diphenylethan-1-one (commercially available as IRGACURE 651 from Ciba Specialty Chemicals)

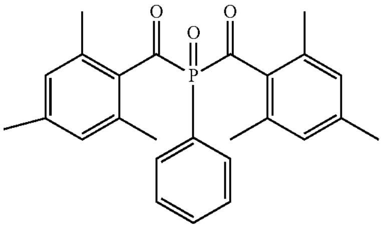

(phenylphosphoryl)bis(mesitylmethanone) (commercially available as IRGACURE 819 from Ciba Specialty Chemicals)

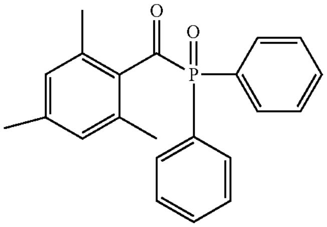 [SMILES: Cc1cc(C)c(C(=O)P(=O)(c2ccccc2)c2ccccc2)c(C)c1]

(diphenylphosphoryl)(mesityl)methanone (commercially available as DAROCUR TPO from Ciba Specialty Chemicals)

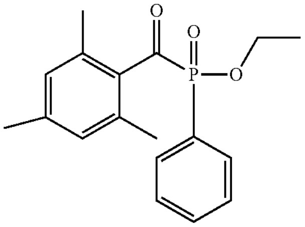 [SMILES: CCOP(=O)(C(=O)c1c(C)cc(C)cc1C)c1ccccc1]

ethyl phenyl(2,4,6-trimethylbenzoyl)phosphinate (commercially available as OMNIRAD TPO L from IGM Resins)

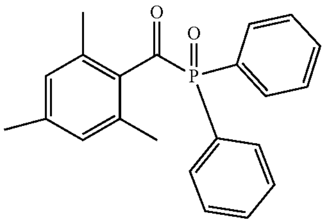 [SMILES: Cc1cc(C)c(C(=O)P(=O)(c2ccccc2)c2ccccc2)c(C)c1]

(diphenylphosphoryl)(mesityl)methanone

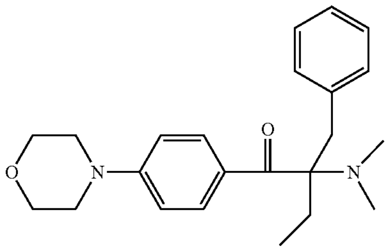 [SMILES: CCC(Cc1ccccc1)(C(=O)c1ccc(N2CCOCC2)cc1)N(C)C]

2-benzyl-2-(dimethylamino)-1-(4-morpholinophenyl)butan-1-one (commercially available as Irgacure 369 from Ciba Specialty Chemicals)

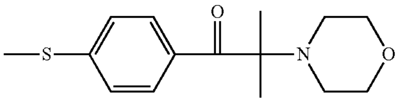 [SMILES: CSc1ccc(C(=O)C(C)(C)N2CCOCC2)cc1]

2-methyl-1-(4-(methylthio)phenyl)-2-morpholinopropan-1-one (commercially available as Irgacure 907 from Ciba Specialty Chemicals)

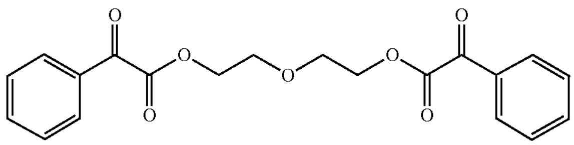 [SMILES: O=C(OCCOCCOC(=O)C(=O)c1ccccc1)C(=O)c1ccccc1]

oxybis(ethane-2,1-diyl) bis(2-oxo-2-phenylacetate) (commercially available as Irgacure 754 from Ciba Specialty Chemicals)

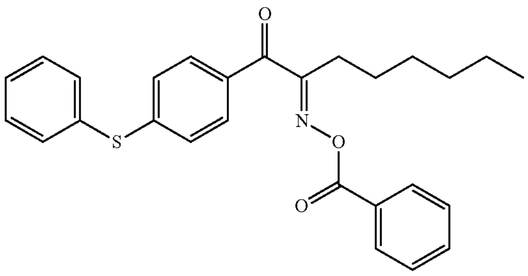 [SMILES: CCCCCC/C(=N\OC(=O)c1ccccc1)C(=O)c1ccc(Sc2ccccc2)cc1]

(E)-2-((benzoyloxy)imino)-1-(4-(phenylthio)phenyl) octan-1-one (commercially available as Irgacure OXE01 from Ciba Specialty Chemicals)

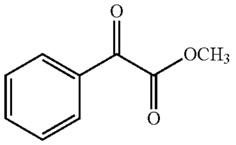 [SMILES: COC(=O)C(=O)c1ccccc1]

methyl 2-oxo-2-phenylacetate (commercially available as DAROCUR MBF from Ciba Specialty Chemicals)

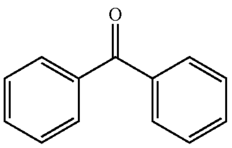 [SMILES: O=C(c1ccccc1)c1ccccc1]

benzophenone (commercially available as DAROCUR BP from Ciba Specialty Chemicals)

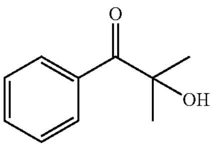

2-hydroxy-2-methyl-1-phenylpropan-1-one (commercially available as DAROCUR 1173 from Ciba Specialty Chemicals)

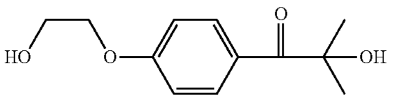 [SMILES: CC(C)(O)C(=O)c1ccc(OCCO)cc1]

2-hydroxy-1-(4-(2-hydroxyethoxy)phenyl)-2-methylpropan-1-one (commercially available as Irgacure 2959 from Ciba Specialty Chemicals)

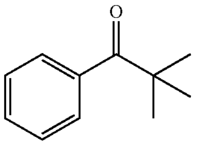

2,2-dimethyl-1-phenylpropan-1-one and a mixture in any combination thereof.

It should be noted that more than one photo radical generator can be employed so as to obtain beneficial effects. Accordingly, in some embodiments the composition of this invention contains two or more photo radical generators selected from the above list. Any of the suitable amounts of the photo radical generator can be employed in the composition of this invention which will bring about the intended effect. Generally, such amounts may vary from about 5 parts per hundred parts resin (pphr) to about 15 pphr or higher. In some embodiments the amount of photo radical generator employed is from about 8 pphr to about 12 pphr.

The composition of this invention further includes a thermal radical initiator. Any of the compounds which when exposed to heat forms a radical can be employed for this purpose. Suitable generic classes of such compounds include peroxides, peracids, azo compounds, N-alkoxyamines, N-acyloxyamines, and the like. Non-limiting examples of such specific thermal radical generators include benzoyl peroxide, dicumyl peroxide, m-chloroperbenzoic acid, methyl ethyl ketone peroxide, azobisisobutyronitrile (AIBN), (1-phenyl-3,3-dipropyltriazene), (1-(phenyldiazenyl)pyrrolidine), (1-(phenyldiazenyl)piperidine), (1-(phenyldiazenyl)azepane) and the like.

Again, any of the suitable amounts of the thermal radical generator can be employed in the composition of this invention which will bring about the intended effect. Generally, such amounts may vary from about 2 parts per hundred parts resin (pphr) to about 10 pphr or higher. In some embodiments the amount of photo radical generator employed is from about 3 pphr to about 6 pphr.

It has been further observed that employing one or more photosensitizers in the composition of this invention provides additional beneficial effects. Most notably, the photosensitizers facilitate photo radical generation from the photo radical generator at a particular wavelength of the radiated light. For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, and mixtures thereof. In some exemplary embodiments, suitable sensitizer components include mixtures thereof. Generally, as mentioned above, the photosensitizers absorb energy from the radiated light source and transfers that energy to the photo radical generator of formulae (IV) or (V) employed in the composition of this invention so as to generate the radicals to initiate the crosslinking. It has been now found that the photosensitizer as employed herein may itself act as a photo radical generator. Accordingly, in some embodiments, the composition of this invention contains only one or more photosensitizers, which not only activates the composition at certain wavelength but also generates photo radical triggering the crosslinking. In some other embodiments the composition of this invention contains one or more photo radical generators of formulae (IV) or (V) in combination with one or more photosensitizers of formula (VI) as described hereinbelow.

Accordingly, the composition of this invention contains one or more of a photosensitizer of the formula (VI):

(VI)

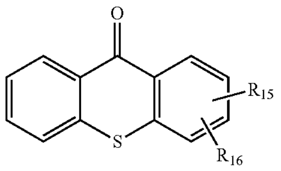

wherein $R_{15}$ and $R_{16}$ are the same or different and independently of each other selected from the group consisting of hydrogen, halogen, methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl and ($C_6$-$C_{10}$)-aryloxy.

Non-limiting examples of suitable one or more photosensitizers may be selected from the group consisting of:

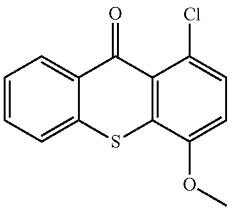

1-chloro-4-methoxy-9H-thioxanthen-9-one

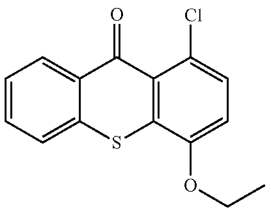 [SMILES: CCOc1ccc(Cl)c2c(=O)c3ccccc3sc12]

1-chloro-4-ethoxy-9H-thioxanthen-9-one

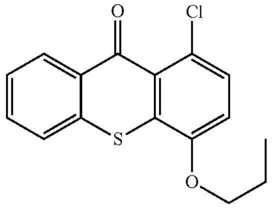 [SMILES: CCCOc1ccc(Cl)c2c(=O)c3ccccc3sc12]

1-chloro-4-propoxy-9H-thioxanthen-9-one (commercially available as CPTX from IGM resins)

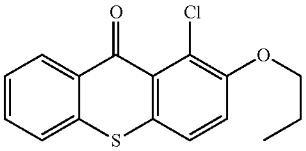 [SMILES: CCCOc1ccc2sc3ccccc3c(=O)c2c1Cl]

1-chloro-2-propoxy-9H-thioxanthen-9-one

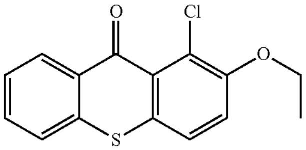 [SMILES: CCOc1ccc2sc3ccccc3c(=O)c2c1Cl]

1-chloro-2-ethoxy-9H-thioxanthen-9-one

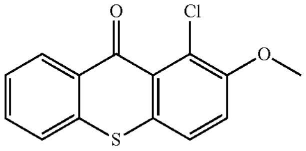 [SMILES: COc1ccc2sc3ccccc3c(=O)c2c1Cl]

1-chloro-2-methoxy-9H-thioxanthen-9-one

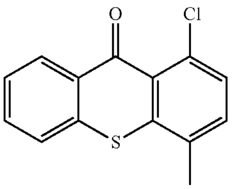 [SMILES: Cc1ccc(Cl)c2c(=O)c3ccccc3sc12]

1-chloro-4-methyl-9H-thioxanthen-9-one

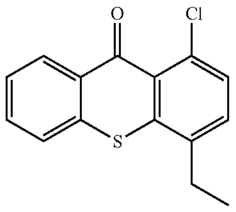 [SMILES: CCc1ccc(Cl)c2c(=O)c3ccccc3sc12]

1-chloro-4-ethyl-9H-thioxanthen-9-one

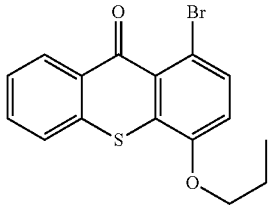

1-bromo-4-propoxy-9H-thioxanthen-9-one

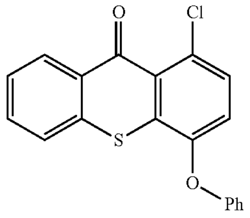 [SMILES: O=c1c2ccccc2sc2c(Oc3ccccc3)ccc(Cl)c12]

1-chloro-4-phenoxy-9H-thioxanthen-9-one

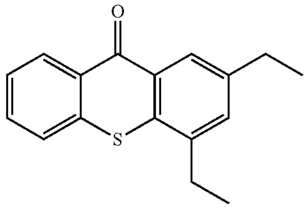 [SMILES: CCc1cc(CC)c2sc3ccccc3c(=O)c2c1]

2,4-diethyl-9H-thioxanthen-9-one (commercially available as OMNIRAD DETX from IGM resins); and

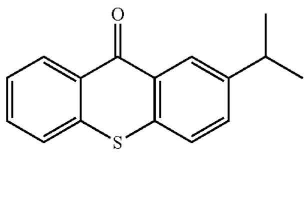 [SMILES: CC(C)c1ccc2sc3ccccc3c(=O)c2c1]

2-isopropyl-9H-thioxanthen-9-one (commercially available as OMNIRAD ITX from IGM resins)

It should again be noted that any one of these compounds can be used as photosensitizers alone or as mixtures in any combination thereof, and only if needed depending upon the intended use and to obtain the desirable benefit. Again, any amount of one or more of aforementioned sensitizers can be used in the composition of this invention so as to bring about the desired results. Generally it has now been found that such amounts can range from 0.5 to 5 parts per hundred parts of the polymer resin (pphr). In some embodiments such amounts range from 1 to 3 pphr.

The compositions of the present invention also include one or more crosslinking agents that are advantageously capable of bonding with the end-capped substituted unsaturated cyclic imide group of the polyamic acid or polyimide or any other functional group available in the polymeric chain for further crosslinking when exposed to a suitable radiation. Such materials include, but are not limited to, crosslinking compounds that incorporate one or more of an oxazoline group such as 2-oxazoline-2-yl group, a methylol group such as a N-hydroxy methylaminocarbonyl group or an alkoxymethyl group such as a N-methoxy methylaminocarbonyl group, acrylate group, thiol or thioalkyl group, maleimide, and the like. Generally, the aforementioned bonding with the substituted unsaturated cyclic imide end group of the polyimide is a cross-linking reaction that is initiated by photo radical generated during the photo-irradiation at an appropriate temperature. Further, such crosslinking can be completed further by curing at an appropriate temperature post irradiation, generally at or above 150° C. for an appropriate amount of time. Such thermal curing is further facilitated by thermal radical generator as well as the thermal crosslinking agents such as for example, epoxy groups such as a glycidyl group, an epoxycyclohexyl group, an oxetane group, and the like. It should be noted however that it is surprising that such curing of the composition of this invention can be carried out at much lower temperature than conventionally used for polyimides known in the art, which is generally carried out at higher than 250° C. or even higher than 300° C.

Accordingly, in some embodiments of this invention, the photosensitive composition of this invention, without any limitation, contains one or more crosslinking agents selected from the following:

an epoxy acrylate;

a polyester acrylate;

a polyether acrylate;

an aliphatic urethane acrylate;

an aromatic urethane acrylate;

a multifunctional epoxy; and a multifunctional mercapto($C_2$-$C_8$)alkanoate.

Exemplary crosslinking agents that may be employed in the composition of this invention without any limitation may be selected from the group consisting of:

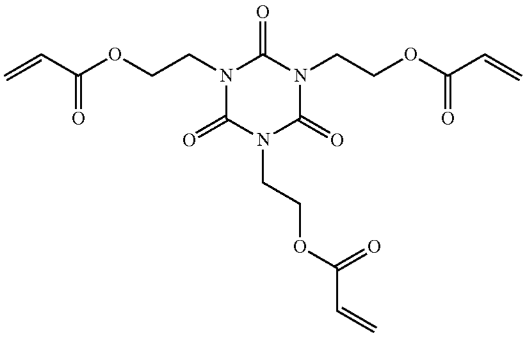 [SMILES: C=CC(=O)OCCn1c(=O)n(CCOC(=O)C=C)c(=O)n(CCOC(=O)C=C)c1=O]

(2,4,6-trioxo-1,3,5-triazinane-1,3,5-triyl)tris(ethane-2,1-diyl) triacrylate (TAEICY)

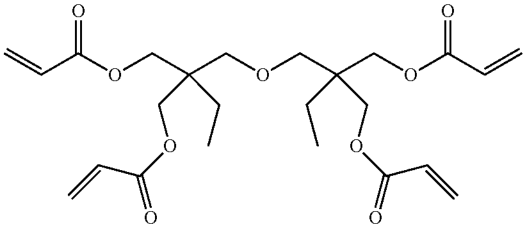 [SMILES: C=CC(=O)OCC(CC)(COCC(CC)(COC(=O)C=C)COC(=O)C=C)COC(=O)C=C]

(oxybis(methylene))bis(2-ethylpropane-2,1,3-triyl) tetraacrylate (BTMPTA)

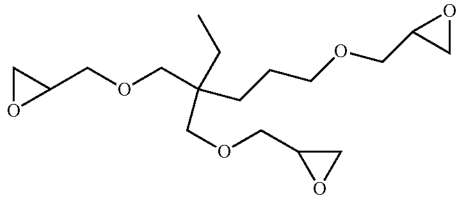 [SMILES: CCC(CCCOCC1CO1)(COCC1CO1)COCC1CO1]

2,2'-(((2-ethyl-2-((oxiran-2-ylmethoxy)methyl)propane-1,3-diyl)bis(oxy))bis(methylene))bis(oxirane) (TMPTGE, from Nagase)

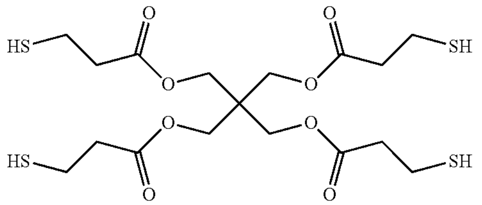 [SMILES: O=C(CCS)OCC(COC(=O)CCS)(COC(=O)CCS)COC(=O)CCS]

2,2-bis(((3-mercaptopropanoyl)oxy)methyl)propane-1,3-diyl bis(3-mercaptopropanoate) (PET3MP); and

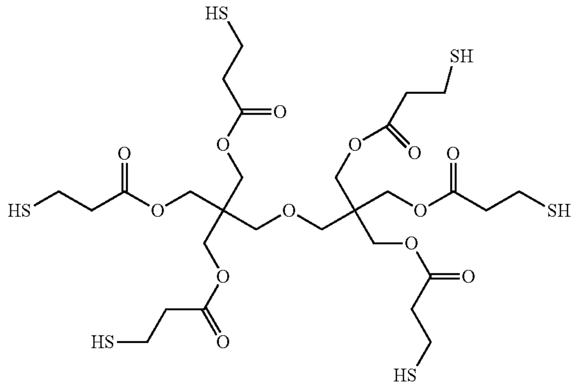 [SMILES: O=C(CCS)OCC(COCC(COC(=O)CCS)(COC(=O)CCS)COC(=O)CCS)(COC(=O)CCS)COC(=O)CCS]

2,2,2',2'-tetrakis(3-mercaptopropanoyl)-3,3'(3-mercaptopropanoyl)-1,1'-dipropyl ether (DPEH3MP, from TCI)

The photosensitive composition of this invention further encompasses one or more compounds or additives having utility as, among other things, adhesion promoter, a surface leveling agent, antioxidants, a synergist, silane coupling agents, phenolic resins, flame retardants, plasticizers, curing accelerators, and the like. Examples of surface leveling agents include a variety of non-ionic, amphoteric and anionic surfactants available in the art, which provide, among other things, wetting, spreading and levelling properties. Exemplary surface leveling agents include without any limitation, non-ionic polymeric fluorochemical surfactant, such as for example, FC-4432 available from 3M Advanced Materials Division, a short chain perfluoro-based ethoxylated nonionic fluorosurfactant, such as for example, Chemguard S-550, CAPSTONE fluorosurfactants available as both nonionic and amphoteric forms from DuPont, PolyFox fluorosurfactants from OMNOVA Solutions, and the like. In addition, any of the known conventional surfactants may be used in combination with the above noted surfactants, such known non-ionic surfactants include for example, perfluoroalkyl polyoxyethylene ethanols, fluorinated alkyl esters, perfluoroalkylamine oxides and fluorinated organosiloxane compounds. Various other such commercially available surfactants include Florade FC-4430 from Sumitomo 3M Ltd., Surflon S-141 and S-145 from Asahi Glass Co., Ltd., Unidyne DS-401, DS-4031 and DS-451 from Daikin Industries Ltd., Megaface F-8151 from Dainippon Ink & Chemicals, Inc., and X-70-093 from Shin-Etsu Chemical Co., Ltd.

Non-limiting examples of such other compounds or additives are selected from the group consisting of the following, commercially available materials are indicated by such commercial names.

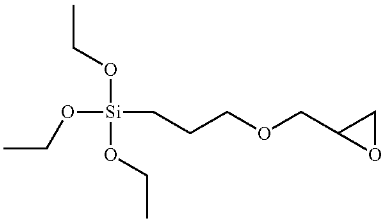 [SMILES: CCO[Si](CCCOCC1CO1)(OCC)OCC]

triethoxy(3-(oxiran-2-ylmethoxy)propyl)silane, also known as 3-glycidoxypropyl triethoxysilane (3-GTS or (KBE-403 from Shin-Etsu Chemical Co., Ltd.))

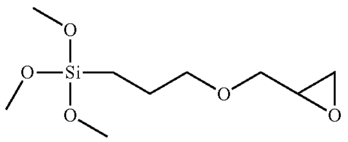

trimethoxy(3-(oxiran-2-ylmethoxy)propyl)silane, also commonly known as 3-glycidoxypropyl trimethoxysilane (KBM-403E from Shin-Etsu Chemical Co., Ltd.)); $C_6H_5(CH_3O)_3Si$ phenyltrimethoxysilane $C_6H_5(C_2H_5O)_3Si$ phenyltriethoxysilane (KBE-103 commercially available from Gelest or Shin-Etsu Chemical Co., Ltd.)

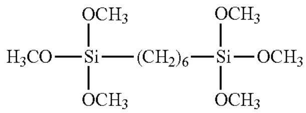

3,3,10,10-tetramethoxy-2,11-dioxa-3,10-disiladodecane (SIB-1832 from Gelest)

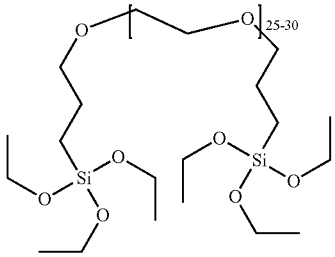

N,N'-bis[(3-triethoxysilylpropyl)aminocarbonyl]polyethylene oxide (SIB-1824.84 from Gelest)

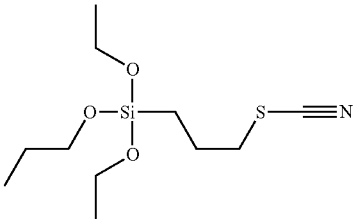 [SMILES: CCCO[Si](CCCSC#N)(OCC)OCC]

diethoxy(propoxy)(3-thiocyanatopropyl)silane (SIT 7908.0 from Gelest)

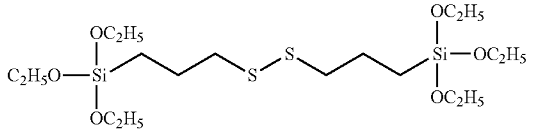

4,4,13,13-tetraethoxy-3,14-dioxa-8,9-dithia-4,13-disilahexadecane

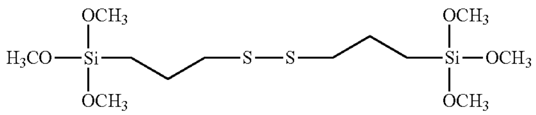 [SMILES: CO[Si](CCCSSCCC[Si](OC)(OC)OC)(OC)OC]

3,3,12,12-tetramethoxy-2,13-dioxa-7,8-dithia-3,12-disilatetradecane (Si-75 or Si-266 from Evonik)

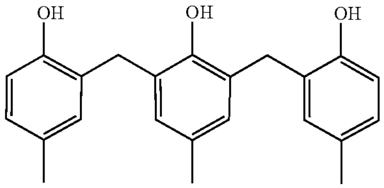 [SMILES: Cc1ccc(O)c(Cc2cc(C)cc(Cc3cc(C)ccc3O)c2O)c1]

2,2'-((2-hydroxy-5-methyl-1,3-phenylene)bis(methylene)) bis(4-methylphenol) (antioxidant AO-80 from TCI Japan)

In general among other things, various compounds and additives as enumerated herein improve overall performance of the photosensitive composition of this invention thus providing well defined photo-patterned structures having a variety of utilities, including but not limited to chip-stack applications, redistribution layers (RDL) and for forming CMOS image sensor dam structures. Advantageously, it has also been found that certain of the additives as described herein may feature more than one function. For example, some of the additives as enumerated hereinabove may not only exhibit certain photosensitization activity during exposure to radiation but may also facilitate as a cross linking agent as further described above. Therefore, additives as used herein do not limit the activity of such compounds to only one of such property but may also facilitate other functions of the photosensitive compositions of this invention.

The photosensitive composition embodiments, in accordance with the present invention, are first applied to a desired substrate to form a film. Such a substrate includes any appropriate substrate as is, or may be used for electrical, electronic or optoelectronic devices, for example, a semiconductor substrate, a ceramic substrate, a glass substrate. With regard to said application, any appropriate coating method can be employed, for example, spin coating, spraying, doctor blading, meniscus coating, ink jet coating and slot coating.

Next, the coated substrate is heated to facilitate the removal of residual casting solvent, for example to a temperature from 70° C. to 130° ° C. for from 1 to 30 minutes, although other appropriate temperatures and times can be used. After the heating, the film is generally imagewise exposed to an appropriate wavelength of actinic radiation, wavelength is generally selected based on the choice of the photo radical generator and/or photosensitizer incorporated into the polymer composition as described herein. However, generally such appropriate wavelength is from 200 to 700 nm. It will be understood that the phrase "imagewise exposure" means exposing through a masking element to provide for a resulting pattern of exposed and unexposed portion of the film, as further illustrated by specific examples hereinbelow.

After an imagewise exposure of the film formed from photosensitive composition in accordance with the present invention, a development process is employed. For the negative tone compositions as contemplated by the present invention, such development process removes only the unexposed portions of the film thus leaving a negative image of the masking layer in the film. A post exposure bake (PEB) is employed prior to the aforementioned development process, generally at a temperature from 90° C. to 130° C. for from 1 to 10 minutes, although other appropriate temperatures and times can be used.

Suitable developers can include organic solvents such as propylene glycol methyl ether acetate (PGMEA), 2-heptanone, cyclohexanone, NMP, GBL, cyclopentanone, butyl acetate, and mixtures in any combination thereof, among others.

Thus some composition embodiments of the present invention provide self-imageable films that after imagewise exposure, the resulting image is developed using an organic solvent. After the image is developed, the substrate is rinsed to remove excess developer solution, typical rinse agents are water or appropriate alcohols and mixtures thereof. The excess developer can also be removed by blowing a stream of nitrogen on to the substrate. Other methods of removing excess developer include spinning the developed wafer at high spin speeds of about 1000-3000 rpm for 10-30 sec followed by applying a stream of nitrogen.

After the aforementioned rinsing, the substrate is dried and the imaged film finally cured. That is to say, the image is fixed. Where the remaining layer has already been exposed during the imagewise exposure, image fixing is generally accomplished by causing further reaction within the remaining portions of the film. Such reaction is generally a cross-linking reaction that can be initiated by heating and/or non-imagewise or blanket exposure of the remaining material. Such exposure and heating can be in separate steps or combined as is found appropriate for the specific use of the imaged film. The blanket exposure is generally performed using the same energy source as employed in the imagewise exposure or a higher energy source and may be for a longer period of time although any other appropriate energy source can be employed. The heating is generally carried out at a desirable temperature, for example, from above 150° C. for a time of from 40 min to one or more hours. Where the remaining layer has been exposed during the imagewise exposure, image fixing is generally accomplished by a heating step to be tailored to complete any reaction initiated by the exposure. However an additional blanket exposure and heating, as discussed above, can also be employed. It should be realized, however, that the choice of a final cure process is also a function of the type of device being formed; thus a final fixing of the image may not be a final cure where the remaining layer is to be used as an adhesive layer or structure.

The devices are produced by using embodiments of the composition of the present invention to form layers which are characterized as having high heat resistance, an appropriate water absorption rate, high transparency, and low permittivity. In addition, such layers generally have an advantageous thermo-mechanical properties. Most notably, improved tensile strength, improved elongation to break (ETB) and exhibit higher glass transition temperatures ($T_g$) when compared with conventional materials. For example, the tensile strength of the fully cured composition layer may be higher than 100 MPa and may be in the range of from about 120 MPa to 200 MPa or higher. The ETB of the cured composition layers can be higher than 30 percent and may range from about 50 percent to 100 percent or higher. The $T_g$ of the cured composition layer may be higher than 150° C. and can range from about 150° C. to 200° C. or higher. It should further be noted that the layers formed in this fashion from the composition of this invention also exhibit unusually high thermal decomposition temperature. Accordingly, the 5 percent weight loss temperature ($T_{d5}$) of the cured polymeric layers is generally higher than 300° C. and can range from 300° C. to 420° C. or higher, thus offering hitherto unattainable properties.

As previously mentioned, exemplary applications for embodiments of the photosensitive compositions in accordance with the present invention include die attach adhesive, wafer bonding adhesive, insulation films (interlayer dielectric layers), protecting films (passivation layers), mechanical buffer films (stress buffer layers) or flattening films for a variety of semiconductor devices, and printed wiring boards. Specific applications of such embodiments encompass a die-attach adhesive to form a single or multilayer semiconductor device, dielectric film which is formed on a semiconductor device; a buffer coat film which is formed on the passivation film; an interlayer insulation film which is formed over a circuit formed on a semiconductor device.

Accordingly, some embodiments in accordance with the present invention therefore provide a negative tone photosensitive polymer composition which exhibits enhanced characteristics with respect to one or more of mechanical properties (such as high tensile strength, elongation to break) and at least equivalent or better chemical resistance, as compared to alternate materials. In addition, such embodiments provide generally excellent electrical insulation, adhesion to the substrate, and the like. Thus semiconductor devices, device packages, and display devices are provided that incorporate embodiments in accordance with the present invention.

Advantageously, the photosensitive compositions of this invention can also be used to form adhesive layers for bonding the semiconductor chips to each other, such as in chip-stack applications. For example, a bonding layer used for such a purpose is composed of a cured product of the photosensitive adhesive composition of the present invention. It should be noted that although the adhesive layer is a single-layer structure, it can not only exhibit sufficient adhesiveness to the substrate but also it is expected to be free of significant stress resulting due to the curing step. Accordingly, it is now possible to avoid undesirably thick layer of film encompassing the chip as a laminate. Therefore, it should be noted that the laminates formed in accordance with the present invention are expected to be reliable in that the relaxation of stress concentration between layers caused by thermal expansion difference or the like can be obtained. As a result, the semiconductor device having low height and high reliability can be obtained. That is, devices with low aspect ratio and low thickness can be obtained. Such semiconductor device becomes particularly advantageous to electronic equipment, which has very small internal volume and is in use while carrying as a mobile device, for example.

Even more advantageously, by practice of this invention it is now possible to form a variety of electronic devices featuring hitherto unachievable level of miniaturization, thinning and light-weight, and the function of the semiconductor device is not easily damaged even if such devices are subject to rugged operations such as swinging or dropping.

A cured product of the photosensitive adhesive composition of the present invention, i.e., the adhesive layer or the film generally exhibits an indentation modulus of 2 to 4 GPa at 25° C. The cured product of the photosensitive adhesive composition of the present invention exhibits an indentation modulus of 70 to 120% of the indentation modulus of the non-cured product at 25° C., i.e., before such curing step. Further, the photosensitive adhesive composition of the present invention exhibits an excellent adhesiveness to a suitable substrate, such as for example a semiconductor chip, and adhesiveness of 20 to 200 Newton (N) at 25° C. can be achieved before curing and generally after etching and ashing process.

Thus, it is now envisioned that the photosensitive adhesive composition of the present invention may exhibit an indentation modulus at room temperature after curing which is relatively comparable to the indentation modulus of the uncured sample and not causing significant stress concentration between the semiconductor chips but contributing to forming of the adhesive layer with sufficient adhesiveness. Further, since the indentation modulus in a state before cured is within the predetermined range of indentation modulus after cured, and then, for example, it is not so possible that the photosensitive adhesive composition before cured is significantly deformed or flowed out, it is possible to increase the accuracy of alignment in laminating the semiconductor chips. Furthermore, since the change in indentation modulus before and after curing is relatively small, the shrinkage associated with photosensitivity can be reduced and then the stress at the interface between the semiconductor chips caused by shrinkage on curing can be reduced. This point also contributes to improvement of the reliability of the chip laminate.

Further, in some embodiments of this invention as described above, the electronic and/or the semiconductor device according to this invention encompass a laminated semiconductor element where said lamination consists of a photosensitive composition according to the present invention.

In some embodiments of this invention, the semiconductor device encompassing a redistribution layer (RDL) structure further incorporates a photosensitive composition according to this invention.

Further, in some embodiments of this invention as described above, the semiconductor device encompassing a chip stack structure further includes a photosensitive composition according to this invention.

In yet some other embodiments of this invention as described above, the semiconductor device encompassing a complementary metal oxide semiconductor (CMOS) image sensor dam structure further incorporates a photosensitive composition according to this invention.

In addition, in some embodiments of this invention as described above, a film is formed by the photosensitive composition according to this invention. As further described above, such films generally exhibit excellent chemical, mechanical, elastic properties having a wide variety of utility in electronic, optoelectronic, microelectromechanical applications featuring excellent dielectric properties.

Accordingly, in some embodiments of this invention, there is provided a microelectronic or optoelectronic device encompassing one or more of a redistribution layer (RDL) structure, a chip-stack structure, a CMOS image sensor dam structure, where said structures further incorporates a photosensitive composition according to this invention.

Further, in some embodiments of this invention, there is provided a method of forming a film for the fabrication of a microelectronic or optoelectronic device comprising:

coating a suitable substrate with a composition according to the invention to form a film;

patterning the film with a mask by exposing to a suitable radiation;

developing the film after exposure to form a photopattern; and curing the film by heating to a suitable temperature.

The coating of the substrate with photosensitive composition of this invention can be performed by any of the coating procedures as described herein and/or known to one skilled in the art, such as by spin coating.

In another aspect of this invention there is also provided a cured product comprising the composition of this invention.

This invention is further illustrated by the following examples which are provided for illustration purposes and in no way limit the scope of the present invention.

EXAMPLES (GENERAL)

The following abbreviations have been used hereinbefore and hereafter in describing some of the compounds, instruments and/or methods employed to illustrate certain of the embodiments of this invention:

6FDA—5,5'-(perfluoropropane-2,2-diyl)bis(isobenzofuran-1,3-dione);
PMDA—1H,3H-benzo[1,2-c:4,5-c']difuran-1,3,5,7-tetraone;
6BF—4,4'-([1,1'-biphenyl]-4,4'-diylbis(oxy))bis(3-(trifluoromethyl)aniline);
BZXPh-5—2-(4-aminophenyl)benzo[d]oxazol-5-amine;
PFMB—2,2'-bis(trifluoromethyl)-[1,1'-biphenyl]-4,4'-diamine;
HFBAPP—4,4'-(((perfluoropropane-2,2-diyl)bis(4,1-phenylene))bis(oxy))dianiline;
NBDA—bicyclo[2.2.1]heptane-2,5-diyldimethanamine;
IA—itaconic anhydride;
IRGACURE 369—2-benzyl-2-(dimethylamino)-1-(4-morpholinophenyl)butan-1-one;
DCP—dicumyl peroxide;
CPTX—1-chloro-4-propoxy-9H-thioxanthen-9-one;
BTMPTA—(oxybis(methylene))bis(2-ethylpropane-2,1,3-triyl) tetraacrylate;
TAEICY—(2,4,6-trioxo-1,3,5-triazinane-1,3,5-triyl)tris(ethane-2,1-diyl) triacrylate;
DPEH3MP—2,2,2',2'-tetrakis(3-mercaptopropanoyl)-3,3'(3-mercaptopropanoyl)-1,1'-dipropyl ether;
KBM-403E—trimethoxy(3-(oxiran-2-ylmethoxy)propyl)silane;
FC-4432—a non-ionic polymeric fluorochemical surfactant;
NMP—N-methyl-2-pyrrolidone;
GBL—γ-butyrolactone;
DMAc—N,N-dimethylacetamide;
DMSO—dimethyl sulfoxide;
THF—tetrahydrofuran;
GPC—gel permeation chromatography;
$M_w$—weight average molecular weight;
$M_n$—number average molecular weight;

PDI—polydispersity index;

$^1$H-NMR—proton nuclear magnetic resonance spectroscopy;

FT-IR—Fourier transform infrared spectroscopy;

ppm—parts per million;

pphr—parts per hundred parts of resin.

Example 1

6FDA/6BF/BZXPh-5/IA (48.1/29.6/19.8/2.5)

A mixture of 6BF (15.13 g, 30 mmol), BZXPh-5 (4.5 g, 20 mmol) and IA (0.28 g, 2.5 mmol) were dissolved in NMP (165.1 g) and stirred at ambient temperature under a nitrogen atmosphere. To this solution was then added 6FDA (21.63 g, 48.7 mmol) in small batches while stirring that generated about 5° C. exotherm. The reaction mixture was continued to stir at ambient temperature for 20 hours during which time the solution turned viscous. A small portion of this solution was diluted with DMAc for GPC analysis. GPC-DMAc-$M_w$=99,600, $M_n$=47,850, PDI=2.08.

The polyamic acid solution (127 g containing about 25 g polymer) thus obtained above was mixed with anhydrous pyridine (25 g), acetic anhydride (25 g) and cyclopentanone (100 g) and the solution heated to 90° C. for 4 hours under nitrogen atmosphere while stirring. The reaction mixture was allowed to cool to ambient temperature and added to excess water/methanol (80/20) mixture (1.5 L) to isolate the polymer. The gummy product was washed with excess (1 L) heptanes and dried in a vacuum oven at 80° C. for 24 hours to obtain a solid product (23 g, 92% isolated yield), which was characterized by GPC, $^1$H NMR and FT-IR. GPC-DMAc-$M_w$=99,900, $M_n$=44,400, PDI=2.25. $^1$H-NMR (500 MHZ) spectra measured in deuterated DMSO showed only traces of a peak centered at about 10.4 ppm indicating that the polyamic acid was quantitatively imidized. Multiple peaks were observed at 6.7-8.6 ppm for the aromatic protons. FT-IR spectra showed peaks at 1379 $cm^{-1}$ and 722 $cm^{-1}$ characteristic of polyimides.

Example 2

6FDA/PMDA/6BF/PFMB/IA (24.1/24.1/29.6//19.7/2.5)

6BF (15.13 g, 30 mmol) and PFMB (6.41 g, 20 mmol) were dissolved in NMP (150.7 g) and stirred at ambient temperature under a nitrogen atmosphere. A mixture of 6FDA (10.83 g, 24.4 mmol), PMDA (5.317 g, 24.4 mmol) and IA (0.28 g, 2.5 mmol) was added in small batches to the above solution while stirring. The reaction mixture was stirred at ambient temperature for an additional period of 20 hours during which time the solution turned viscous. An additional amount of NMP (33 g) was added to this viscous solution. A small portion of this solution was then diluted with DMAc for GPC analysis. GPC-DMAc-$M_w$=107,050, $M_n$=60,700, PDI=1.76. A small sample of the polymer solution was also added to excess water/acetone (80/20) mixture to isolate the polymer for $^1$H NMR analysis. The gummy product was washed with excess water/acetone (80/20) mixture and dried in a vacuum oven at 50-60° C. for 24 hours to obtain a solid product. $^1$H-NMR (500 MHz) spectra measured in deuterated DMSO showed a broad peak centered at about 13.5 ppm for COOH and 10.99 ppm, 10.88 ppm, and 10.86 ppm for —NH— groups of the polyamic acid in approximately 1:1 ratio. Multiple peaks were observed at 6.7-8.7 ppm for the aromatic protons from 6FDA, PMDA PFMB and 6BF.

The polyamic acid solution (65 g containing about 11 g polymer) thus obtained was then mixed with anhydrous pyridine (11 g), acetic anhydride (11 g) and cyclopentanone (62 g) and the solution was heated to 90° C. for 6 hours under nitrogen atmosphere while stirring. The reaction mixture was allowed to cool to ambient temperature and THF (25 g) was added. This solution was added to excess water/methanol (80/20) mixture (1.7 L) to isolate the polymer. The gummy product was washed with excess (1.2 L) water/methanol (80/20) mixture and dried in a vacuum oven at 70° C. for 24 hours to obtain a solid product (10.4 g, 95% isolated yield), which was characterized by GPC and $^1$H NMR. GPC-DMAc-$M_w$=143,800, $M_n$=66,150, PDI=2.17. $^1$H-NMR (500 MHZ) spectra measured in deuterated DMSO did not show a broad peak centered at about 13.5 ppm for COOH or 10-11 ppm for —NH— groups indicating that the polyamic acid was quantitatively imidized. Multiple peaks were observed at 6.7-8.7 ppm for the aromatic protons from 6FDA, PMDA PFMB and 6BF. FT-IR spectra showed peaks at 1374 $cm^{-1}$ and 723 $cm^{-1}$ characteristic of polyimides.

Example 3

6FDA/PMDA/HFBAPP/PFMB/IA (24.1/24.1/26.6/19.7/2.5)

HFBAPP (7.78 g, 15 mmol) and PFMB (3.2 g, 10 mmol) were dissolved in NMP (76.2 g) and stirred at ambient temperature under a nitrogen atmosphere. A mixture of 6FDA (5.41 g, 12.2 mmol), PMDA (2.66 g, 12.2 mmol) and IA (0.140 g, 1.25 mmol) was added in small batches to the above solution while stirring. The reaction mixture was stirred at ambient temperature for 20 hours during which time the solution turned viscous. An additional amount of NMP (21 g) was added to the viscous solution. A small portion of this solution was then diluted with DMAc for GPC analysis. GPC-DMAC-$M_w$=74,650, $M_n$=38,400, PDI=2.05.

The polyamic acid solution (100 g containing about 16 g polymer) thus obtained above was mixed with anhydrous pyridine (16 g), acetic anhydride (16 g) and cyclopentanone (75 g) and the solution was heated to 90° C. for 6 hours under nitrogen atmosphere while stirring. The polymer became insoluble as the imidization progressed.

Example 4

6FDA/PMDA/6BF/BZXPh-5/IA (29/19.1/29.6/19.8/2.5)

6BF (10.6 g, 21 mmol) and BZXPh-5 (3.15 g, 14 mmol) were dissolved in NMP (103.4 g) and stirred at ambient temperature under a nitrogen atmosphere. A mixture of 6FDA (9.14 g, 20.6 mmol), PMDA (2.96 g, 13.6 mmol) and IA (0.196 g, 1.75 mmol) was added in small batches to the above solution while stirring. The reaction mixture was stirred at ambient temperature for 20 hours during which time the solution turned viscous. An additional amount of NMP (25 g) was added to this viscous solution. A small portion of this solution was then diluted with DMAc for GPC analysis. GPC-DMAc-$M_w$=103,700, $M_n$=54,200, PDI=1.91.

The polyamic acid solution (118 g containing about 20 g polymer) thus obtained above was mixed with anhydrous pyridine (20 g), acetic anhydride (20 g) and cyclopentanone (88 g) and the solution heated to 95° C. for 2 hours under nitrogen atmosphere while stirring. The polymer became insoluble as the imidization progressed.

Example 5

6FDA/6BF/NBDA/MPSA (45/40/10/10)

6BF (15.13 g, 30 mmol) and NBDA (1.157 g, 7.5 mmol) were dissolved in NMP (125.1 g) and stirred at ambient temperature under a nitrogen atmosphere. To this solution was added a mixture of 6FDA (14.99 g, 33.8 mmol) and MPSA (1.157 g, 25 mmol) in small batches while stirring. The reaction mixture was continued to stir at ambient temperature for 20 hours during which time the solution turned viscous. A small amount of this solution was diluted with DMAc for GPC analysis. GPC-DMAc-$M_w$=44,950, $M_n$=24,250, PDI=1.85. A small sample of the polymer solution was added to excess heptane to isolate the polymer. The gummy product was washed with excess heptane and dried in a vacuum oven at 70° C. for 24 hours to obtain a solid product. $^1$H-NMR (500 MHz) spectra measured in deuterated DMSO showed a broad peak centered at about 13 ppm for COOH and 10.9 ppm, and 10.3 ppm for —NH— groups of the poly(amic acid). Multiple peaks were observed at 6.7-8.7 ppm for the aromatic protons from 6FDA and 6BF.

Example 6

Tensile Property Measurements

Each of the polyimide formed in Example 1 and Comparative Example 1 were dissolved in a solvent mixture of GBL and cyclopentanone solvent mixture (3:1 weight ratio) to form respectively 20 weight percent solution for polymer of Example 1 and 15 weight percent solution for polymer of Comparative Example 1. Portions of these solutions were mixed with DCP (6 pphr) and filtered using 0.45 μm pore polytetrafluoroethylene (PTFE) disc filters. The polyimide polymer solutions from Example 1 and Comparative Example 1 containing no DCP were also filtered using 0.45 μm pore polytetrafluoroethylene (PTFE) disc filters. These four polymer solutions were spin coated separately on to a 4" bare Si wafers by spinning at 300-310 rpm for 30 seconds followed by post apply bake (PAB) at 110° C. for 3 minutes to generate films in 10-14 μm range. The films were then cured at 220° C. for 4 hours in an oven under nitrogen atmosphere. The cured films were subsequently diced to 6 mm wide film strips and lifted out of the bare Si wafers by immersing in a dilute (1 wt. %) hydrogen fluoride (HF) solution in water. Tensile properties were measured using Instron and the results are summarized in Table 1. It is evident from the data presented in Table 1 that the tensile strength of Example 1 with DCP is substantially higher than that of the Comparative Example 1, thus demonstrating that the incorporation of IA as an end cap substantially increases the tensile property. In addition, incorporation of DCP further increases the tensile strength without causing any adverse effects on other properties.

TABLE 1

| Polymer Example No. | DCP present | Tensile Strength MPa, (SD) | Tensile Strength Max, MPa | ETB % (SD) | ETB Max, % | CTE ppm/K | $T_g$ (° C.) | $T_{d5}$ (° C.) |
|---|---|---|---|---|---|---|---|---|
| Comp. Ex. 1 | No | 118 (6) | 125 | 20 (8) | 28 | 50 | 273 | nm |
| Comp. Ex. 1 | Yes | 110 (7) | 117 | 13 (5) | 19 | 45 | 264 | 573 |
| Example 1 | No | 116 (2) | 119 | 20 (5) | 27 | 34 | 267 | nm |
| Example 1 | Yes | 131 (7) | 137 | 13 (3) | 18 | 41 | 269 | 575 |

SD—standard deviation;
ETB—elongation to break;
CTE—coefficient of thermal expansion;
$T_g$—glass transition temperature;
$T_{d5}$—temperature at which the material loses 5% of its weight;
nm—not measured.

Example 7

Photosensitive Compositions—Thermo-Mechanical Properties

Isolated polyimide polymer from Example 1 was dissolved in a mixture of GBL/cyclopentanone (3:1 weight ratio) to prepare 16 wt. % polymer solution. To this solution was added Irgacure-369 as a photo radical generator (10 pphr), CPTX as the photo-sensitizer (2 pphr), KBM-403E as the adhesion promoter (5 pphr) and FC-4432 as the surface leveling agent (0.3 pphr). This solution was then formulated into four different compositions by adding (DCP, 4 pphr) as a thermal radical initiator into two of these four compositions and also adding two different types of acrylate cross linkers as summarized in Table 2.

TABLE 2

| Composition Ex. No. | DCP | BTMPTA | TAEICY |
|---|---|---|---|
| Example 6A | — | 70 pphr | — |
| Example 6B | 4 pphr | 70 pphr | — |
| Example 6C | — | — | 70 pphr |
| Example 6D | 4 pphr | — | 70 pphr |

The compositions thus formed in Examples 7A to 7D were filtered using 0.45 μm or 1 μm pore polytetrafluoroethylene (PTFE) disc filters. These compositions were spin coated on 4" bare Si wafers by spinning at 500-800 rpm for 30 seconds followed by post apply bake (PAB) at 110° C. for 3 minutes to generate films in 15-23 μm range. The films were then exposed using a broad band Hg-vapor light source (at 365 nm using a band pass filter) at an exposure dose of 1500 mJ/cm$^2$. The exposed films were cured at 170° C. for 4 hours in an oven under nitrogen atmosphere. The cured films were subsequently diced to 6 mm wide film strips and lifted out of the bare Si wafers by immersing in a dilute (1 wt. %) hydrogen fluoride (HF) solution in water. Tensile and thermal properties were measured using Instron and TMA respectively. The results are summarized in Table 3. It is evident from the data presented in Table 3 that the use of DCP in the compositions of this invention as a thermal radical initiator increases both tensile strength and the glass transition temperature of the films so generated.

TABLE 3

| Composition Example No. | DCP | Tensile Strength (MPa), (SD) | ETB (%), (SD) | $T_g$ (° C.) |
|---|---|---|---|---|
| Example 6A | — | 109 (0.5) | 13 (7) | 187 |
| Example 6B | 4 pphr | 116 (0.6) | 17 (8) | 218 |
| Example 6C | — | 129 (4) | 6 (1) | 172 |
| Example 6D | 4 pphr | 141 (8) | 7 (2) | 204 |

Example 8

Photosensitive Compositions—Thermo-Mechanical Properties

Isolated polyimide polymers from Comparative Example 1 and Example 2 were dissolved separately in a mixture of GBL and cyclopentanone (3:1 weight ratio) to prepare 15-20 wt. % solutions. To these solutions were added Irgacure-369 as a photo radical generator (10 pphr), CPTX as the photo-sensitizer (2 pphr), BTMPTA as an acrylate cross linker (30 pphr), TAEICY (30 pphr) as an acrylate cross linker, KBM-403E as the adhesion promoter (5 pphr), FC-4432 as the surface leveling agent (0.3 pphr) and dicumyl peroxide (DCP) as the thermal radical initiator (4 pphr). These compositions were filtered using 0.45 μm pore polytetrafluoroethylene (PTFE) disc filters and kept refrigerated before use, and designated respectively as Example 8A (polymer of Comparative Example 1), Example 8B (polymer of Example 1) and Example 8C (polymer of Example 4).

Each of the above three compositions were spin coated on 4" bare Si wafers by spinning at 300-800 rpm for 30 seconds followed by post apply bake (PAB) at 110° C. for 3 minutes to generate films having thickness in the range of 10-13 μm. The films were then exposed using a broad band Hg-vapor light source (at 365 nm using a band pass filter) at an exposure doses of 3500 mJ/$cm^2$ (for Examples 8A and 8B) or 1500 mJ/$cm^2$ (for Example 8C). The exposed films were cured at 220° C. for 4 hours (for Examples 8A and 8B) or 170° C. for 4 hours (for Example 8C) in an oven under nitrogen atmosphere. The cured films were subsequently diced to 6 mm wide film strips and lifted out of the bare Si wafers by immersing in a dilute (1 wt. %) hydrogen fluoride (HF) solution in water. Tensile and thermal properties were measured using Instron and TMA or TGA respectively. The results are summarized in Table 4. It is again evident that the IA end capped polymers, namely Examples 1 and 4, exhibit superior mechanical properties when compared with that of the Comparative Example 1.

TABLE 4

| Polymer example | Comp. Ex. 1 | Example 1 | Example 4 |
|---|---|---|---|
| Cure condition, ° C./hours | 220/4 | 220/4 | 170/4 |
| Tensile Strength, MPa (SD) | 112 (7) | 129 (11) | 122 (7) |
| Tensile Strength (max), MPa | 121 | 144 | 131 |
| ETB, % (SD) | 9 (2) | 6 (1) | 35 (26) |
| ETB (max), % | 11 | 7 | 62 |
| Young's Modulus, GPa | 3.0 (0.2) | 3.5 (0.3) | 3.3 (0.2) |
| CTE, ppm/K | 61 | 69 | 29 |
| $T_g$, ° C. | 230 | 226 | 183 |
| $T_{d5}$, ° C. | 428 | 433 | 355 |

The compositions as formed above were spin coated on 4" $SiO_2$ wafers by spinning at 1300-1700 rpm for 30 seconds followed by post apply bake (PAB) at 110° C. for 3 minutes to generate films of thickness in 2-4 μm range. The films were then exposed using a broad band Hg-vapor light source (at 365 nm using a band pass filter) at an exposure dose of 0-2500 mJ/$cm^2$ through a mask to generate negative tone images of lines, trenches, pillars and holes followed by a post exposure bake (PEB) at 110° C. for 2 minutes. These films were immersed in cyclopentanone for 30-35 seconds to reveal the lines (L), pillars (P) and holes (H). Holes were not opened for the films from composition Examples 8A and 8C. The photo imaging properties are summarized in Table 5.

TABLE 5

| Composition Example No. | FT μm | Dose mJ/$cm^2$ | BFL % | Resolution L/P/H, μm |
|---|---|---|---|---|
| Example 7A | 3.64 | 2500 | 62% | 15/15/— |
| Example 7B | 2.54 | 2418 | 29% | 7/10/10 |
| Example 7C | 2.41 | 2500 | 57% | 10/10/— |

Figure 2:
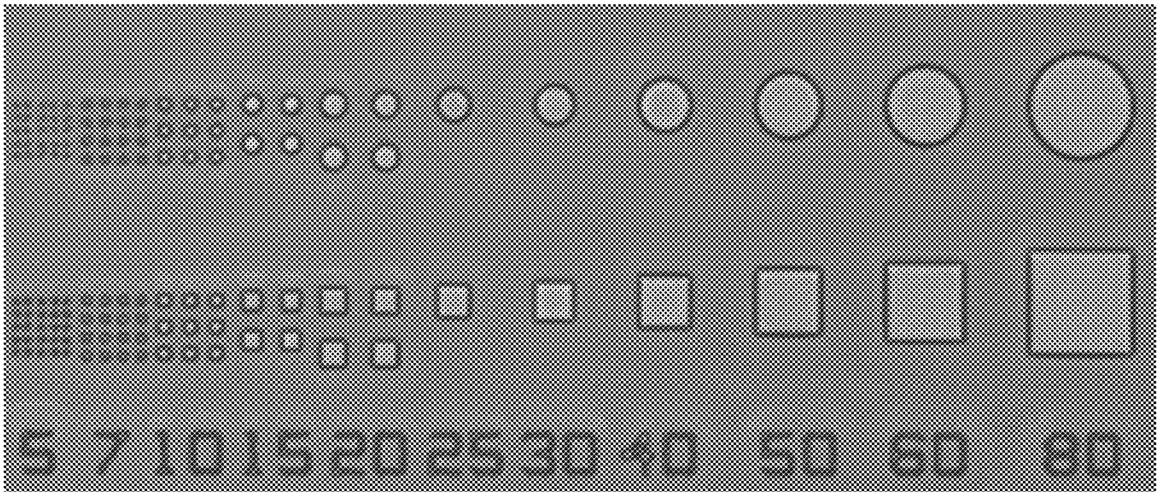
Figure 3:
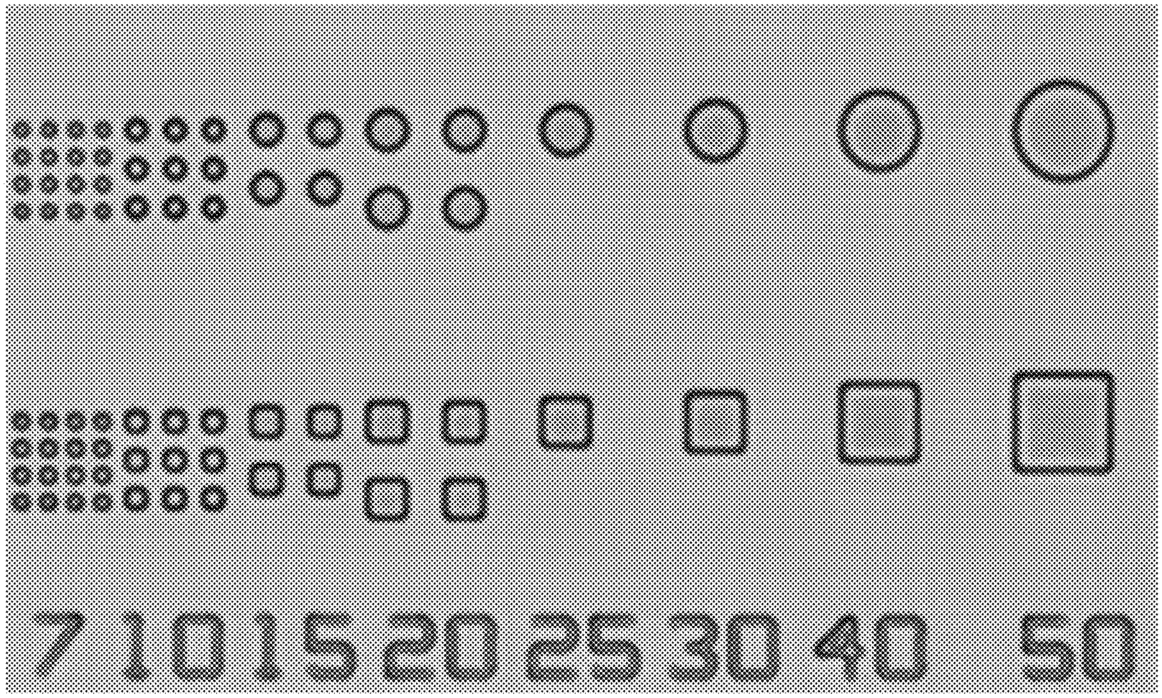

Top down optical micrograph images from the photo imaging of the composition Example 7B are shown in FIGS. 1 to 3. FIG. 1 shows the top down view of the lines. FIG. 2 shows the top down view of the pillars. FIG. 3 shows the top down view of the holes.

Example 9

Photosensitive Compositions

Polyamic acid polymer solution before isolation from Example 5 in NMP (15 wt. % solution) was used to prepare two photosensitive compositions, 9A and 9B. To this solution was added Irgacure-369 as a photo radical generator (10 pphr), CPTX as the photo-sensitizer (2 pphr), BTMPTA as an acrylate cross linker (50 pphr), KBM-403E as the adhesion promoter (5 pphr) and FC-4432 as the surface leveling agent (composition 8A). DPEH3MP (50 phr) was also added to composition Example 9B as a thiol cross linker. These compositions were filtered using 0.45 μm pore polytetrafluoroethylene (PTFE) disc filters and kept refrigerated before use, and designated respectively as Example 9A (contained only BTMPTA as an acrylate cross linker) and Example 9B (contained BTMPTA as an acrylate cross linker and DPEH3MP as a thiol cross linker).

Each of the above two compositions were spin coated on 4" $SiO_2$ wafers by spinning at 900-1200 rpm for 30 seconds followed by post apply bake (PAB) at 110° C. for 3 minutes to generate films having thicknesses in the range of 5-7 μm. The films were then exposed using a broad band Hg-vapor light source (at 365 nm using a band pass filter) at an exposure dose of 0-2000 mJ/$cm^2$ through a mask to generate negative tone images of lines (L), pillars (P) and holes (H). The exposed films were post exposure baked (PEB) at 110° C. for 2 minutes. These films were immersed in cyclopentanone for 120 seconds (composition Example 9A) and 70 seconds (composition Example 9B) to reveal the lines (L), pillars (P) and holes (H). The photo imaging properties are summarized in Table 6.

TABLE 6

| Composition Example No. | FT μm | Dose mJ/cm$^2$ | BFL % | Resolution L/P/H, μm |
|---|---|---|---|---|
| Example 8A | 5.40 | 1500 | 40% | 15/20/20 |
| Example 8B | 6.19 | 765 | 18% | 15/15/40 |

Comparative Example 1

6FDA/6BF/BZXPh-5 (50/30/20)

A mixture of 6BF (15.13 g, 30 mmol) and BZXPh-5 (4.51 g, 20 mmol) was dissolved in NMP (167.4 g) and stirred at ambient temperature under a nitrogen atmosphere. To this solution was then added 6FDA (22.12 g, 50 mmol) in small batches while stirring that generated about 5° C. exotherm. The reaction mixture was stirred at ambient temperature for 20 hours. A small portion of this solution was diluted with DMAc for GPC analysis. GPC-DMAc-$M_w$=174,300, $M_n$=85,600, PDI=2.04. A small sample of the polymer solution was also added to excess water/acetone (80/20) mixture to isolate the polymer for $^1$H NMR analysis. The gummy product was washed with excess heptane and dried in a vacuum oven at 80-90° C. for 24 hours to obtain a solid product. $^1$H-NMR (500 MHz) spectra measured in deuterated DMSO showed a broad peak centered at about 13.5 ppm for COOH and 10.96 ppm, 10.94 ppm, 10.86 ppm and 10.84 ppm for —NH— groups of the polyamic acid in approximately 1:1 ratio. Multiple peaks were observed at 6.7-8.4 ppm for the aromatic protons from 6FDA, BZXPh-5 and 6BF.

The polyamic acid solution (100 g containing 20 g polymer) thus obtained above was mixed with anhydrous pyridine (25 g) and acetic anhydride (25 g) and the solution heated to 90° C. for 4 hours under nitrogen atmosphere while stirring. The reaction mixture was allowed to cool to ambient temperature and was added to excess water/acetone (80/20) mixture (1.5 L) to isolate the polymer. The gummy product was washed with excess (1 L) heptanes and dried in a vacuum oven at 80-90° C. for 24 hours to obtain a solid product (18.2 g, 92% isolated yield), which was characterized by GPC, $^1$H NMR and FT-IR. GPC-DMAc-$M_w$=178,800, $M_n$=80,050, PDI=2.23. $^1$H-NMR (500 MHz) spectra measured in deuterated DMSO showed only traces of a broad peak centered at about 13 ppm for COOH and 10-11 ppm for —NH— groups of the polyamic acid indicating that the polyamic acid was quantitatively imidized. Multiple peaks were observed at 6.7-8.6 ppm for the aromatic protons of 6FDA, 6BF and BZXPh-5. FT-IR spectra showed peaks at 1378 cm$^{-1}$ and 722 cm$^{-1}$ characteristic of polyimides.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A process for forming an end capped polyimide of formula (IB):

(IB)

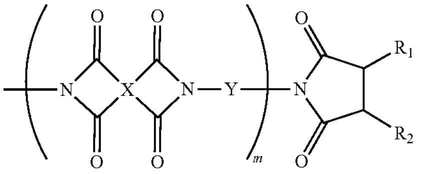

wherein:

m is an integer of at least 50;

X is derived from one or more dianhydrides selected from the group consisting of:

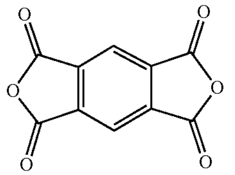 [SMILES: O=c1oc(=O)c2cc3c(=O)oc(=O)c3cc12]

1H,3H-benzo[1,2-c:4,5-c']difuran-1,3,5,7-tetraone (PMDA);

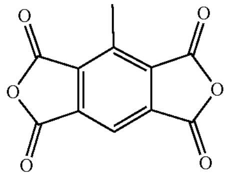 [SMILES: Cc1c2c(=O)oc(=O)c2cc2c(=O)oc(=O)c12]

4-methyl-1H,3H-benzo[1,2-c:4,5-c']difuran-1,3,5,7-tetraone;

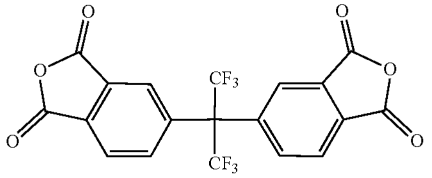

5,5'-(perfluoropropane-2,2-diyl)bis(isobenzofuran-1,3-dione) (6FDA); and

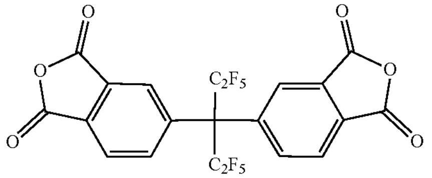

5,5'-(perfluoropentane-3,3-diyl)bis(isobenzofuran-1,3-dione);

Y is derived from one or more diamines selected from the group consisting of:

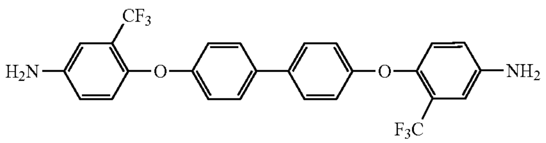

4,4'-([1,1'-biphenyl]-4,4'-diylbis(oxy))bis(3-(trifluoromethyl)aniline) (6BF);

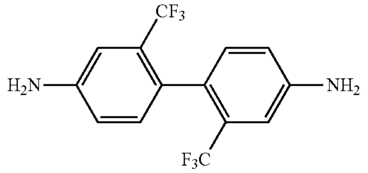 [SMILES: Nc1ccc(-c2ccc(N)cc2C(F)(F)F)c(C(F)(F)F)c1]

2,2'-bis(trifluoromethyl)-[1,1'-biphenyl]-4,4'-diamine (PFMB);

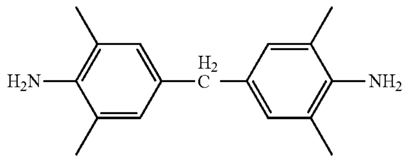 [SMILES: Cc1cc(Cc2cc(C)c(N)c(C)c2)cc(C)c1N]

4,4'-methylenebis(2,6-dimethylaniline) (DO3);

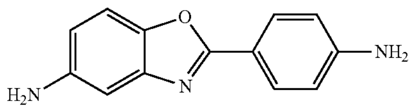 [SMILES: Nc1ccc(-c2nc3cc(N)ccc3o2)cc1]

2-(4-aminophenyl)benzo[d]oxazol-5-amine (BZXPh-5);

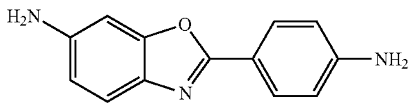 [SMILES: Nc1ccc(-c2nc3ccc(N)cc3o2)cc1]

2-(4-aminophenyl)benzo[d]oxazol-6-amine (BZXPh-6);

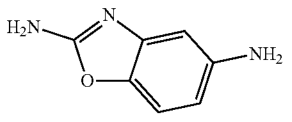 [SMILES: Nc1ccc2oc(N)nc2c1]

benzo[d]oxazole-2,5-diamine (BZX-5); and

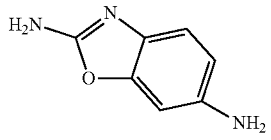 [SMILES: Nc1ccc2nc(N)oc2c1]

benzo[d]oxazole-2,6-diamine (BZX-6); and $R_1$ and $R_2$ are the same or different and each independently of one another selected from the group consisting of hydrogen, linear or branched ($C_1$-$C_{16}$)alkenyl, hydroxy($C_1$-$C_{12}$)alkenyl, perfluoro($C_1$-$C_{12}$)alkenyl, and ($C_6$-$C_{10}$)aryl($C_1$-$C_3$)alkenyl; and with the proviso that $R_1$ and $R_2$ are not both hydrogen;

comprising:

reacting the one or more dianhydrides, the one or more diamines, and a compound of formula (II):

(II)

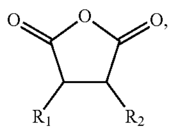

in N-methyl-2-pyrrolidone at ambient temperature to form a polyamic acid solution;

mixing the polyamic acid solution with cyclopentanone, acetic anhydride and pyridine, and heating the mixture at a temperature of about 90° C. for about four hours in nitrogen atmosphere; and cooling to obtain the polyimide of formula (IB), wherein the polyimide of formula (IB) is soluble in an organic solvent selected from the group consisting of N-methyl-2-pyrrolidone (NMP), γ-butyrolactone (GBL), N,N-dimethylacetamide (DMAc), propylene glycol monomethyl ether acetate (PGMEA), dimethyl sulfoxide (DMSO), cyclopentanone, cyclohexanone, 2-butanone, 2-heptanone and mixtures in any combination thereof; and wherein the amount of compound of formula (II) used to form the end capped polyimide of formula (IB) is about 2.5 mole percent based on total moles of dianhydride, diamine and the compound of formula (II).

2. The process according to claim 1, wherein X is derived from one or more dianhydrides selected from the group consisting of:

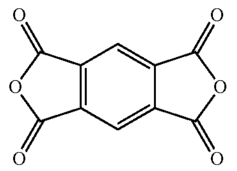 [SMILES: O=c1oc(=O)c2cc3c(=O)oc(=O)c3cc12]

1H,3H-benzo[ 1,2-c:4,5-c']difuran-1,3,5,7-tetraone (PMDA); and

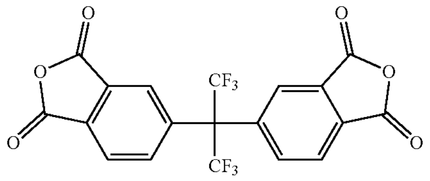

5,5'-(perfluoropropane-2,2-diyl)bis(isobenzofuran-1,3-dione) (6FDA).

3. The process according to claim 1, wherein Y is derived from one or more diamines selected from the group consisting of:

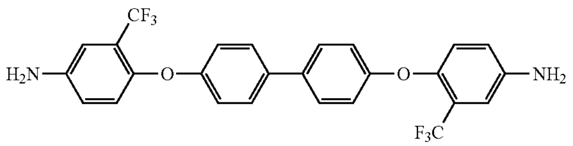

4,4'-([1,1'-biphenyl]-4,4'-diylbis(oxy))bis(3-(trifluoromethyl)aniline) (6BF);

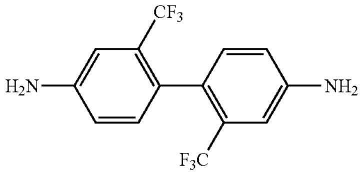 [SMILES: Nc1ccc(-c2ccc(N)cc2C(F)(F)F)c(C(F)(F)F)c1]

2,2'-bis(trifluoromethyl)-[1,1'-biphenyl]-4,4'-diamine (PFMB);

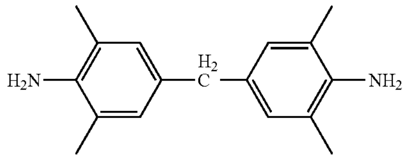 [SMILES: Cc1cc(Cc2cc(C)c(N)c(C)c2)cc(C)c1N]

4,4'-methylenebis(2,6-dimethylaniline) (DO3);

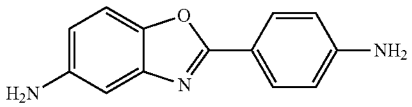

2-(4-aminophenyl)benzo[d]oxazol-5-amine (BZXPh-5); and

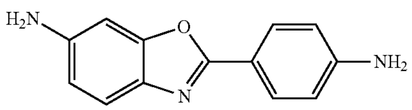 [SMILES: Nc1ccc(-c2nc3ccc(N)cc3o2)cc1]

2-(4-aminophenyl)benzo[d]oxazol-6-amine (BZXPh-6).

4. The process according to claim 1, wherein the compound of formula (II) is selected from the group consisting of:

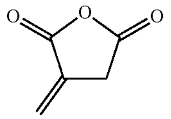

itaconic anhydride (IA);

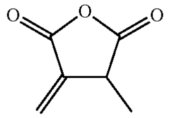

3-methyl-4-methylenedihydrofuran-2,5-dione;

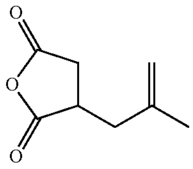

3-(2-methylallyl)dihydrofuran-2,5-dione (MPSA); and

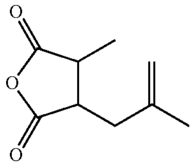

3-methyl-4-(2-methylallyl)dihydrofuran-2,5-dione.

5. The process according to claim 1, wherein the polyimide of formula (IB) is selected from the group consisting of:

a polyimide formed from 5,5'-(perfluoropropane-2,2-diyl)bis(isobenzofuran-1,3-dione) (6FDA), 4,4'-([1,1'-biphenyl]-4,4'-diylbis(oxy))bis(3-(trifluoromethyl)aniline) (6BF), 2-(4-aminophenyl)benzo[d]oxazol-5-amine (BZXPh-5) and itaconic anhydride (IA);

a polyimide formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl)aniline) (6BF), 2,2'-bis(trifluoromethyl)-[1,1'-biphenyl]-4,4'-diamine (PFMB) and itaconic anhydride (IA); and a polyimide formed from 5,5'-(perfluoropropane-2,2-diyl)bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl)aniline) (6BF), 2-(4-aminophenyl)benzo[d]oxazol-5-amine (BZXPh-5) and itaconic anhydride (IA).

6. The process according to claim 1, wherein the polyimide of formula (IB) has weight average molecular weight ($M_w$) of at least 20,000.

7. The process according to claim 1, wherein the polyimide of formula (IB) has weight average molecular weight ($M_w$) of at least 50,000.

8. The process according to claim 1, wherein the polyimide of formula (IB) is soluble in an organic solvent selected from the group consisting of γ-butyrolactone (GBL), cyclopentanone, and a mixture in any combination thereof.

9. A process for forming a patterned film comprising:

a) forming an organic solvent soluble end capped polyimide of formula (IB):

(IB)

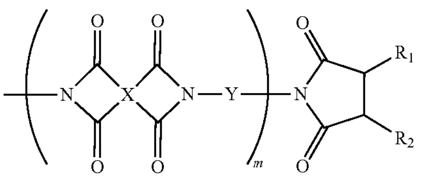

wherein:

m is an integer of at least 50;

X is derived from one or more dianhydrides selected from the group consisting of:

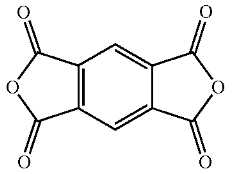 [SMILES: O=c1oc(=O)c2cc3c(=O)oc(=O)c3cc12]

1H,3H-benzo[1,2-c:4,5-c']difuran-1,3,5,7-tetraone (PMDA);

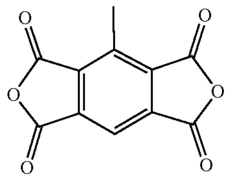 [SMILES: Cc1c2c(=O)oc(=O)c2cc2c(=O)oc(=O)c12]

4-methyl-1H,3H-benzo[1,2-c:4,5-c']difuran-1,3,5,7-tetraone;

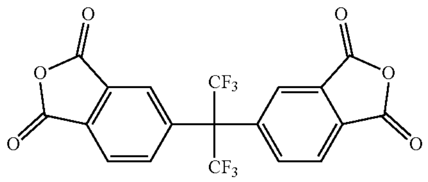 [SMILES: O=C1OC(=O)c2cc(C(c3ccc4c(c3)C(=O)OC4=O)(C(F)(F)F)C(F)(F)F)ccc21]

5,5'-(perfluoropropane-2,2-diyl)bis(isobenzofuran-1,3-dione) (6FDA); and

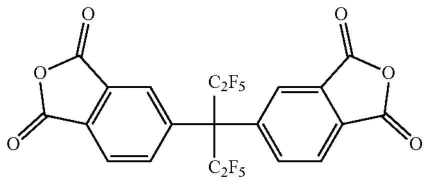

5,5'-(perfluoropentane-3,3-diyl)bis(isobenzofuran-1,3-dione);

Y is derived from one or more diamines selected from the group consisting of:

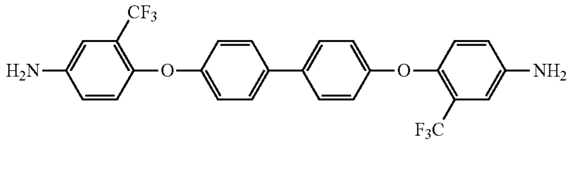 [SMILES: Nc1ccc(Oc2ccc(-c3ccc(Oc4ccc(N)cc4C(F)(F)F)cc3)cc2)c(C(F)(F)F)c1]

4,4'-([1,1'-biphenyl]-4,4'-diylbis(oxy))bis(3-(trifluoromethyl)aniline) (6BF);

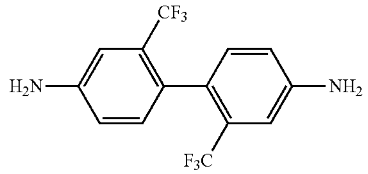 [SMILES: Nc1ccc(-c2ccc(N)cc2C(F)(F)F)c(C(F)(F)F)c1]

2,2'-bis(trifluoromethyl)-[1,1'-biphenyl]-4,4'-diamine (PFMB);

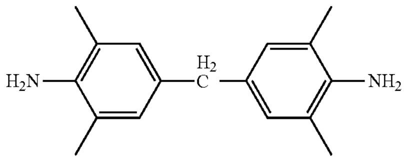 [SMILES: Cc1cc(Cc2cc(C)c(N)c(C)c2)cc(C)c1N]

4,4'-methylenebis(2,6-dimethylaniline) (DO3);

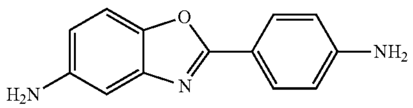 [SMILES: Nc1ccc(-c2nc3cc(N)ccc3o2)cc1]

2-(4-aminophenyl)benzo[d]oxazol-5-amine (BZXPh-5);

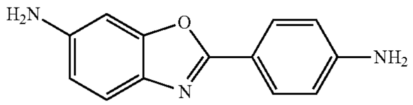 [SMILES: Nc1ccc(-c2nc3ccc(N)cc3o2)cc1]

2-(4-aminophenyl)benzo[d]oxazol-6-amine (BZXPh-6);

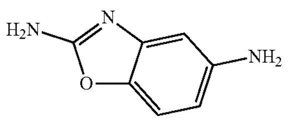 [SMILES: Nc1ccc2oc(N)nc2c1]

benzo[d]oxazole-2,5-diamine (BZX-5); and

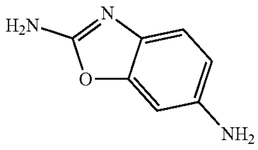 [SMILES: Nc1ccc2nc(N)oc2c1]

benzo[d]oxazole-2,6-diamine (BZX-6); and $R_1$ and $R_2$ are the same or different and each independently of one another selected from the group consisting of hydrogen, linear or branched $(C_1-C_{16})$alkenyl, hydroxy$(C_1-C_{12})$alkenyl, perfluoro$(C_1-C_{12})$alkenyl, and $(C_6-C_{10})$aryl$(C_1-C_3)$alkenyl; and with the proviso that $R_1$ and $R_2$ are not both hydrogen;

by reacting the one or more dianhydrides, the one or more diamines, and a compound of formula (II):

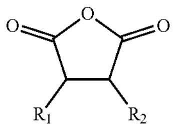

(II)

in N-methyl-2-pyrrolidone at ambient temperature to form a polyamic acid solution;

mixing the polyamic acid solution with cyclopentanone, acetic anhydride and pyridine, and heating the mixture at a temperature of about 90° C. for about four hours in nitrogen atmosphere; and cooling to obtain the polyimide of formula (IB), wherein the polyimide of formula (IB) is soluble in an organic solvent selected from the group consisting of N-methyl-2-pyrrolidone (NMP), γ-butyrolactone (GBL), N,N-dimethylacetamide (DMAc), propylene glycol monomethyl ether acetate (PGMEA), dimethyl sulfoxide (DMSO), cyclopentanone, cyclohexanone, 2-butanone, 2-heptanone and mixtures in any combination thereof; and wherein the amount of compound of formula (II) used to form the end capped polyimide of formula (IB) is about 2.5 mole percent based on total moles of dianhydride, diamine and compound of formula (II); and b) mixing a solution of the polyimide of formula (IB) with a photo radical generator and a thermal radical generator to form a composition;

c) coating the composition on a substrate; and d) exposing the coated substrate to actinic radiation through a mask to form an exposed film;

e) developing the exposed film in cyclopentanone; and f) curing the developed film at a temperature of about 170° C. to obtain the patterned film.

10. The process according to claim 9, wherein the polyimide of formula (IB) is derived from one or more dianhydrides selected from the group consisting of:

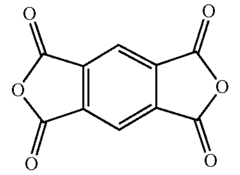 [SMILES: O=c1oc(=O)c2cc3c(=O)oc(=O)c3cc12]

1H,3H-benzo[1,2-c:4,5-c']difuran-1,3,5,7-tetraone (PMDA); and

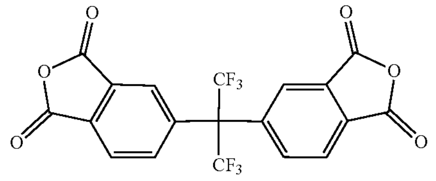

5,5'-(perfluoropropane-2,2-diyl)bis(isobenzofuran-1,3-dione) (6FDA).

11. The process according to claim 9, wherein the polyimide of formula (IB) is derived from one or more diamines selected from the group consisting of:

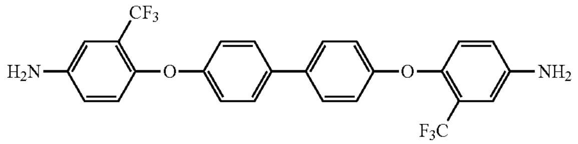

4,4'-([1,1'-biphenyl]-4,4'-diylbis(oxy))bis(3-(trifluoromethyl)aniline) (6BF);

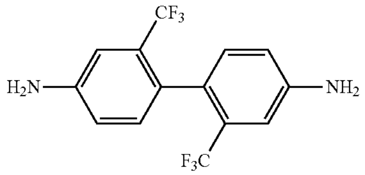 [SMILES: Nc1ccc(-c2ccc(N)cc2C(F)(F)F)c(C(F)(F)F)c1]

2,2'-bis(trifluoromethyl)-[1,1'-biphenyl]-4,4'-diamine (PFMB);

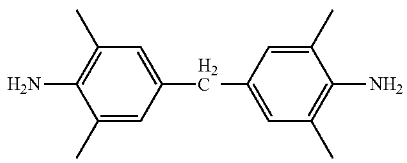 [SMILES: Cc1cc(Cc2cc(C)c(N)c(C)c2)cc(C)c1N]

4,4'-methylenebis(2,6-dimethylaniline) (DO3);

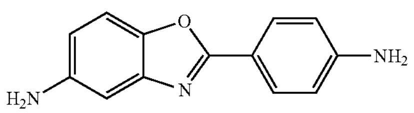

2-(4-aminophenyl)benzo[d]oxazol-5-amine (BZXPh-5); and

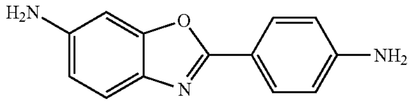 [SMILES: Nc1ccc(-c2nc3ccc(N)cc3o2)cc1]

2-(4-aminophenyl)benzo[d]oxazol-6-amine (BZXPh-6).

12. The process according to claim 9, wherein the substrate is exposed to a radiation using a broad band mercury-vapor light source at a wavelength of about 365 nm.

13. The composition according to claim 9, wherein the polyimide is selected from the group consisting of:

a polyimide formed from 5,5'-(perfluoropropane-2,2-diyl) bis(isobenzofuran-1,3-dione) (6FDA), 4,4'-([1,1'-biphenyl]-4,4'-diylbis(oxy))bis(3-(trifluoromethyl)aniline) (6BF), 2-(4-aminophenyl)benzo[d]oxazol-5-amine (BZXPh-5) and itaconic anhydride (IA);

a polyimide formed from 5,5'-(perfluoropropane-2,2-diyl) bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl) aniline) (6BF), 2,2'-bis(trifluoromethyl)-[1,1'-biphenyl]-4,4'-diamine (PFMB) and itaconic anhydride (IA); and a polyimide formed from 5,5'-(perfluoropropane-2,2-diyl) bis(isobenzofuran-1,3-dione) (6FDA), 1H,3H-benzo[1,2-c:4,5-c']difuran-1,3,5,7-tetraone (PMDA), 4,4'-([1,1'-biphenyl]-4,4'-diylbis(oxy))bis(3-(trifluoromethyl) aniline) (6BF), 2-(4-aminophenyl)benzo[d]oxazol-5-amine (BZXPh-5) and itaconic anhydride (IA).

14. The process according to claim 9, wherein the photo radical generator is selected from the group consisting of:

a compound of formula (IV):

(IV)

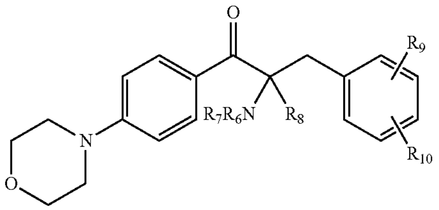

wherein $R_6$ and $R_7$ are the same or different and each independently of one another selected from the group consisting of hydrogen, linear or branched $(C_1\text{-}C_8)$alkyl and $(C_6\text{-}C_{10})$aryl; or $R_6$ and $R_7$ taken together with the nitrogen atom to which they are attached to form a 5 to 7 membered monocyclic ring or 6 to 12 membered bicyclic ring, said ring optionally containing one or more heteroatoms selected from O and N, and said ring optionally substituted with linear or branched $(C_1\text{-}C_8)$alkyl, $(C_6\text{-}C_{10})$aryl, halogen, hydroxy, linear or branched $(C_1\text{-}C_8)$alkoxy and $(C_6\text{-}C_{10})$aryloxy; and $R_8$, $R_9$ and $R_{10}$ are the same or different and each independently of one another is selected from the group consisting of hydrogen, linear or branched $(C_1\text{-}C_{16})$ alkyl, $(C_6\text{-}C_{10})$aryl, $(C_6\text{-}C_{10})$aryl$(C_1\text{-}C_3)$alkyl, hydroxy, halogen, linear or branched $(C_1\text{-}C_{12})$alkoxy and $(C_6\text{-}C_{10})$aryloxy; and a compound of formula (V):

(V)

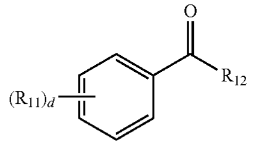

wherein d is an integer from 0 to 3, inclusive;

$R_{11}$ is selected from the group consisting of hydrogen, linear or branched $(C_1\text{-}C_{16})$alkyl, $(C_6\text{-}C_{10})$aryl, $(C_6\text{-}C_{10})$aryl$(C_1\text{-}C_3)$alkyl, hydroxy, halogen, linear or branched $(C_1\text{-}C_{12})$alkoxy and $(C_6\text{-}C_{10})$aryloxy;

$R_{12}$ is selected from the group consisting of linear or branched $(C_1\text{-}C_{16})$alkyl, $(C_3\text{-}C_8)$cycloalkyl, $(C_6\text{-}C_{10})$ aryl, $(C_6\text{-}C_{10})$aryl$(C_1\text{-}C_3)$alkyl, $(C_6\text{-}C_{10})$aryl$(C_1\text{-}C_6)$alkylphosphinate, $(C_6\text{-}C_{10})$heterocycle$(C_1\text{-}C_3)$alkyl, a group of formula $C(O)—(OCH_2CH_2)_e—OC(O)C(O)$ $(C_6\text{-}C_{10})$aryl, where e is an integer from 2 to 4, inclusive, $C(O)C(O)O(C_1\text{-}C_3)$alkyl and a group of formula (C):

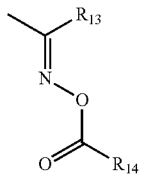

wherein $R_{13}$ is linear or branched $(C_1\text{-}C_{16})$alkyl; and $R_{14}$ is $(C_6\text{-}C_{10})$aryl;

and where each of said alkyl, cycloalkyl, aryl and heterocycle may additionally be substituted with one or more groups selected from the group consisting of hydroxy, linear or branched $(C_1\text{-}C_6)$alkyl, linear or branched $(C_1\text{-}C_6)$alkoxy and linear or branched thio $(C_1\text{-}C_6)$alkyl.

15. The process according to claim 9, wherein the photo radical generator is selected from the group consisting of:

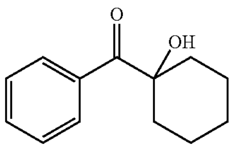 [SMILES: O=C(c1ccccc1)C1(O)CCCCC1]

(1-hydroxycyclohexyl)(phenyl)methanone;

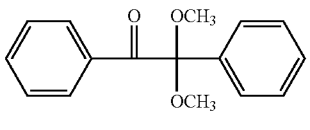

2,2-dimethoxy-1,2-diphenylethan-1-one;

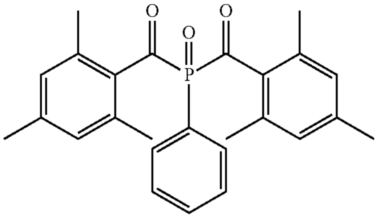

(phenylphosphoryl)bis(mesitylmethanone);

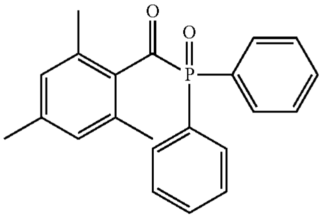 [SMILES: Cc1cc(C)c(C(=O)P(=O)(c2ccccc2)c2ccccc2)c(C)c1]

(diphenylphosphoryl)(mesityl)methanone;

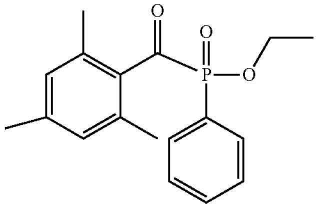 [SMILES: CCOP(=O)(C(=O)c1c(C)cc(C)cc1C)c1ccccc1]

ethyl phenyl(2,4,6-trimethylbenzoyl)phosphinate;

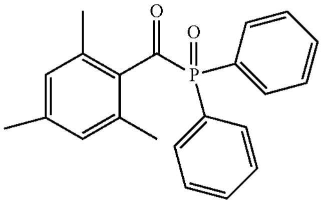 [SMILES: Cc1cc(C)c(C(=O)P(=O)(c2ccccc2)c2ccccc2)c(C)c1]

(diphenylphosphoryl)(mesityl)methanone;

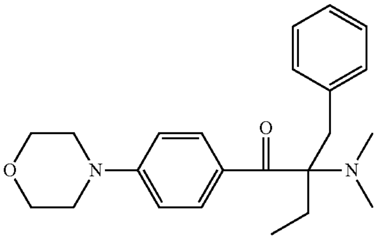 [SMILES: CCC(Cc1ccccc1)(C(=O)c1ccc(N2CCOCC2)cc1)N(C)C]

2-benzyl-2-(dimethylamino)-1-(4-morpholinophenyl)butan-1-one;

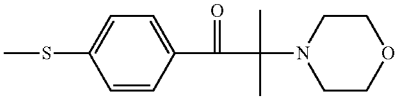 [SMILES: CSc1ccc(C(=O)C(C)(C)N2CCOCC2)cc1]

2-methyl-1-(4-(methylthio)phenyl)-2-morpholinopropan-1-one;

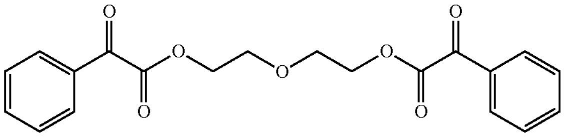 [SMILES: O=C(OCCOCCOC(=O)C(=O)c1ccccc1)C(=O)c1ccccc1]

oxybis(ethane-2,1-diyl) bis(2-oxo-2-phenylacetate);

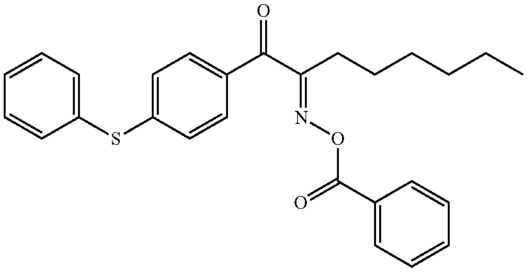 [SMILES: CCCCCC/C(=N\OC(=O)c1ccccc1)C(=O)c1ccc(Sc2ccccc2)cc1]

(E)-2-((benzoyloxy)imino)-1-(4-(phenylthio)phenyl)octan-1-one;

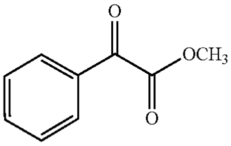 [SMILES: COC(=O)C(=O)c1ccccc1]

methyl 2-oxo-2-phenylacetate;

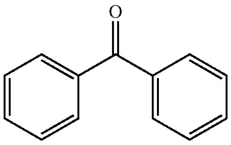 [SMILES: O=C(c1ccccc1)c1ccccc1]

benzophenone;

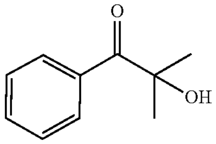

2-hydroxy-2-methyl-1-phenylpropan-1-one;

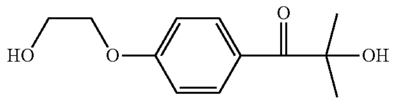 [SMILES: CC(C)(O)C(=O)c1ccc(OCCO)cc1]

2-hydroxy-1-(4-(2-hydroxyethoxy)phenyl)-2-methylpropan-1-one;

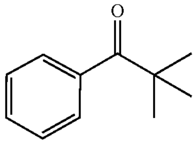

2,2-dimethyl-1-phenylpropan-1-one;

and a mixture in any combination thereof.

16. The process according to claim 9, wherein the thermal radical generator is selected from the group consisting of: benzoyl peroxide, dicumyl peroxide, m-chloroperbenzoic acid, methyl ethyl ketone peroxide, azobisisobutyronitrile (AIBN), (1-phenyl-3,3-dipropyltriazene), (1-(phenyldiazenyl)pyrrolidine), (1-(phenyldiazenyl)piperidine) and (1-(phenyldiazenyl)azepane).

17. The process according to claim 9, further comprising mixing the solution of the polyimide of formula (IB) with one or more photosensitizers selected from the group consisting of:

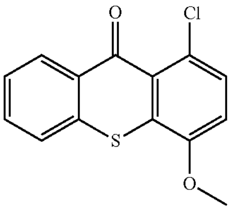 [SMILES: COc1ccc(Cl)c2c(=O)c3ccccc3sc12]

1-chloro-4-methoxy-9H-thioxanthen-9-one;

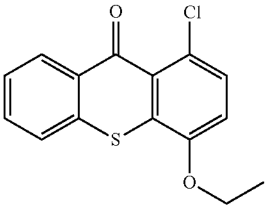 [SMILES: CCOc1ccc(Cl)c2c(=O)c3ccccc3sc12]

1-chloro-4-ethoxy-9H-thioxanthen-9-one;

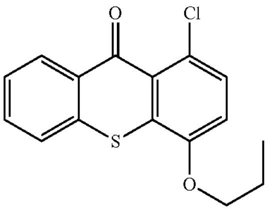 [SMILES: CCCOc1ccc(Cl)c2c(=O)c3ccccc3sc12]

1-chloro-4-propoxy-9H-thioxanthen-9-one;

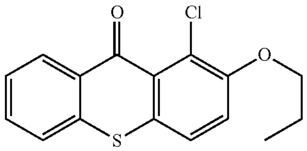 [SMILES: CCCOc1ccc2sc3ccccc3c(=O)c2c1Cl]

1-chloro-2-propoxy-9H-thioxanthen-9-one;

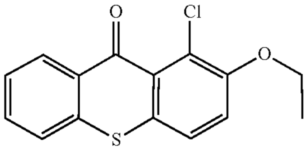 [SMILES: CCOc1ccc2sc3ccccc3c(=O)c2c1Cl]

1-chloro-2-ethoxy-9H-thioxanthen-9-one;

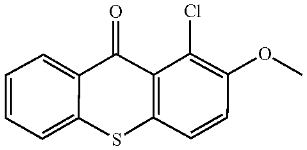 [SMILES: COc1ccc2sc3ccccc3c(=O)c2c1Cl]

1-chloro-2-methoxy-9H-thioxanthen-9-one;

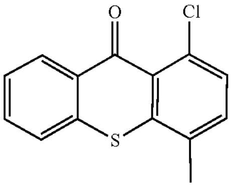 [SMILES: Cc1ccc(Cl)c2c(=O)c3ccccc3sc12]

1-chloro-4-methyl-9H-thioxanthen-9-one;

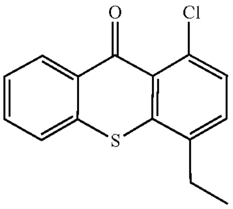 [SMILES: CCc1ccc(Cl)c2c(=O)c3ccccc3sc12]

1-chloro-4-ethyl-9H-thioxanthen-9-one;

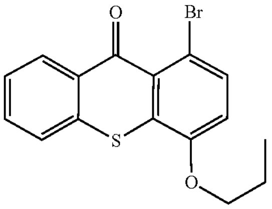 [SMILES: CCCOc1ccc(Br)c2c(=O)c3ccccc3sc12]

1-bromo-4-propoxy-9H-thioxanthen-9-one;

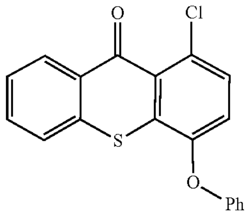 [SMILES: O=c1c2ccccc2sc2c(Oc3ccccc3)ccc(Cl)c12]

1-chloro-4-phenoxy-9H-thioxanthen-9-one;

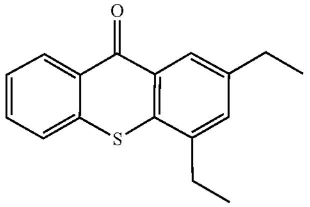 [SMILES: CCc1cc(CC)c2sc3ccccc3c(=O)c2c1]

2,4-diethyl-9H-thioxanthen-9-one; and

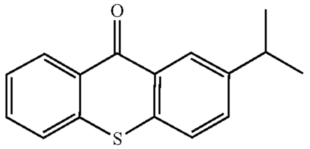 [SMILES: CC(C)c1ccc2sc3ccccc3c(=O)c2c1]

2-isopropyl-9H-thioxanthen-9-one.

18. The process according to claim 9, further comprising mixing the solution of the polyimide of formula (IB) with one or more crosslinking agents selected from the group consisting of:

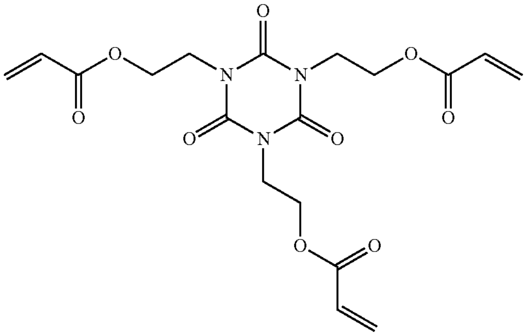 [SMILES: C=CC(=O)OCCn1c(=O)n(CCOC(=O)C=C)c(=O)n(CCOC(=O)C=C)c1=O]

(2,4,6-trioxo-1,3,5-triazinane-1,3,5-triyl)tris(ethane-2,1-diyl) triacrylate (TAEICY);

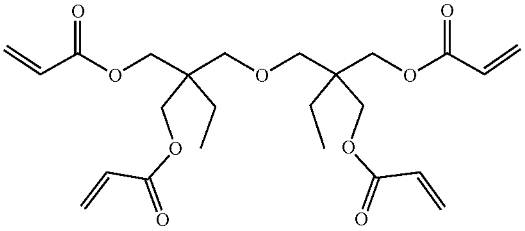 [SMILES: C=CC(=O)OCC(CC)(COCC(CC)(COC(=O)C=C)COC(=O)C=C)COC(=O)C=C]

(oxybis(methylene))bis(2-ethylpropane-2,1,3-triyl) tetraacrylate (BTMPTA);

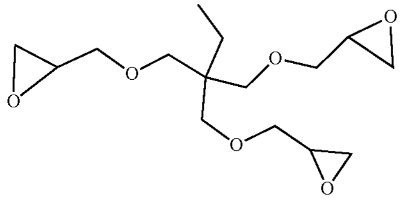 [SMILES: CCC(COCC1CO1)(COCC1CO1)COCC1CO1]

2,2'-(((2-ethyl-2-((oxiran-2-ylmethoxy)methyl)propane-1,3-diyl)bis(oxy))bis(methylene))bis(oxirane) (TMPTGE);

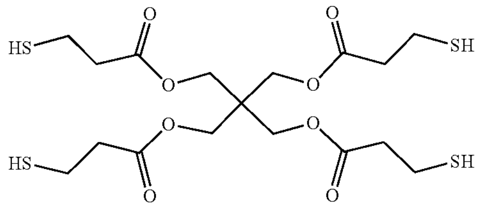 [SMILES: O=C(CCS)OCC(COC(=O)CCS)(COC(=O)CCS)COC(=O)CCS]

2,2-bis(((3-mercaptopropanoyl)oxy)methyl)propane-1,3-diyl bis(3-mercaptopropanoate) (PET3MP); and

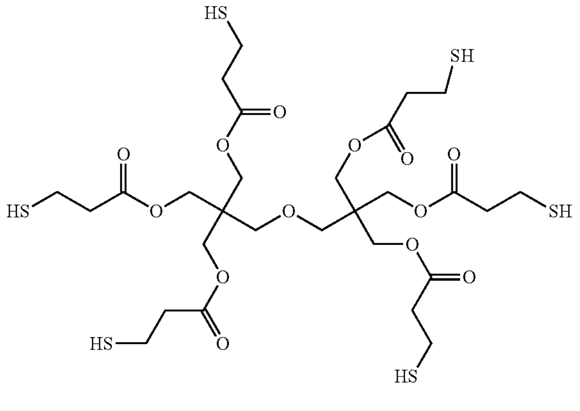 [SMILES: O=C(CCS)OCC(COCC(COC(=O)CCS)(COC(=O)CCS)COC(=O)CCS)(COC(=O)CCS)COC(=O)CCS]

2,2,2',2'-tetrakis(3-mercaptopropanoyl)-3,3'(3-mercaptopropanoyl)-1,1'-dipropyl ether (DPEH3MP).

* * * * *